(12) United States Patent
Keepers

(10) Patent No.: US 10,997,089 B2
(45) Date of Patent: May 4, 2021

(54) CROSS DOMAIN FILTRATION IN MULTI-PROCESSOR ENVIRONMENTS

(71) Applicant: L3 Technologies, Inc., New York, NY (US)

(72) Inventor: Ryan Stewart Keepers, Miami, FL (US)

(73) Assignee: L3 Technologies Inc., New York, NY (US)

( * ) Notice: Subject to any disclaimer, the term of this patent is extended or adjusted under 35 U.S.C. 154(b) by 258 days.

(21) Appl. No.: 16/369,250

(22) Filed: Mar. 29, 2019

(65) Prior Publication Data

US 2020/0310988 A1 Oct. 1, 2020

(51) Int. Cl.
*G06F 12/08* (2016.01)
*G06F 12/14* (2006.01)
(Continued)

(52) U.S. Cl.
CPC .......... *G06F 12/145* (2013.01); *G06F 12/084* (2013.01); *G06F 12/0813* (2013.01);
(Continued)

(58) Field of Classification Search
CPC ...... G06F 12/084; G06F 21/79; G06F 21/604; G06F 12/145; G06F 21/71; G06F 21/74;
(Continued)

(56) References Cited

U.S. PATENT DOCUMENTS

| 4,473,878 A | 9/1984 | Zolnowsky et al. |
| 7,185,192 B1 | 2/2007 | Kahn |

(Continued)

FOREIGN PATENT DOCUMENTS

EP 3147811 A1 * 3/2017 ........... G06F 3/0619

OTHER PUBLICATIONS

M. Böhnert and C. Scholl, "A dynamic virtual memory management under real-time constraints," 2014 IEEE 20th International Conference on Embedded and Real-Time Computing Systems and Applications, Chongqing, 2014, pp. 1-10.*

(Continued)

*Primary Examiner* — Pierre Miche Bataille
(74) *Attorney, Agent, or Firm* — Condo Roccia Koptiw LLP

(57) ABSTRACT

A computing device with a multicore processing unit and a memory management unit (MMU) may provide multi-order failure resistant data isolation and segregation with a cross domain filtration system. The multicore processing unit may include a first processor, a second processor, and a third processor. A first processor may process data via an egress filter task(s). The MMU may allow the egress filter task(s) to write the data to a first segregated physical memory location. A second processor may perform filtering of the data via a cross domain filter task(s). The MMU may allow the cross domain filter task(s) to read from the first segregated physical memory location and write to a second segregated physical memory location. A third processor may process the data via an ingress filter task(s). The MMU may allow the ingress filter task(s) to read the data from the second segregated physical memory location.

20 Claims, 9 Drawing Sheets

(51) Int. Cl.
*G06F 12/0813* (2016.01)
*G06F 21/60* (2013.01)
*G06F 12/0842* (2016.01)
*G06F 21/71* (2013.01)
*G06F 12/084* (2016.01)

(52) U.S. Cl.
CPC ........ *G06F 12/0842* (2013.01); *G06F 21/604* (2013.01); *G06F 21/71* (2013.01)

(58) Field of Classification Search
CPC .. G06F 12/0813; G06F 12/0842; G06F 12/14; G06F 21/60
See application file for complete search history.

(56) References Cited

U.S. PATENT DOCUMENTS

| | | | | |
|---|---|---|---|---|
| 7,657,522 | B1* | 2/2010 | Puzicha | ............ G06F 16/24578 707/723 |
| 7,831,570 | B2 | 11/2010 | Sack et al. | |
| 8,769,127 | B2* | 7/2014 | Selimis | ................... H04L 67/06 709/229 |
| 2013/0034107 | A1* | 2/2013 | Leong | ..................... H04L 49/20 370/400 |
| 2014/0201273 | A1* | 7/2014 | Stern | ................... H04L 63/0428 709/204 |
| 2017/0098094 | A1* | 4/2017 | Winslow | ................. H04L 63/12 |

OTHER PUBLICATIONS

G. Kornaros et al., "Hardware Support for Cost-Effective System-Level Protection in Multi-core SoCs," 2015 Euromicro Conference on Digital System Design, Funchal, 2015, pp. 41-48.*

* cited by examiner

| | D1 Memory Location | | X1 Memory Location | | D2 Memory Location | | |
|---|---|---|---|---|---|---|---|
| | CPU1 D1 Mem | CPU1 D1 Eg Mem | CPU1 D1 In Mem | CPU2 X In Mem | CPU2 X Eg Mem | CPU3 D2 Eg Mem | CPU3 D2 In Mem | CPU3 D2 Mem |
| D1 D1 Task(s) | R/W | | | | | | | |
| D1 Eg Filter Task | | W | | | | | | |
| D1 In Filter Task | | | R | | | | | |
| D1 Eg Handler Task | | | W | | | | | |
| D2 Eg Handler Task | | | | | R | W | | |
| X1 X1 Filter Task | | | | R | R | | | |
| D1 Ig Handler Task | | R | | W | W | | | |
| D2 Ig Handler Task | | | | W | | | R | |
| D2 D2 Task(s) | | | | | | R | | |
| D2 Eg Filter Task | | | | | | | W | |
| D2 In Filter Task | | | | | | | | R/W |

500

R: Read/Ingress
W: Write/Egress

FIG. 5

CROSS DOMAIN FILTRATION IN MULTI-PROCESSOR ENVIRONMENTS

BACKGROUND

Data segregation and/or data filtering may be needed for security and/or for safety purposes in a computing environment with multiple different domains (e.g., security domains). For example, security policies in some applications, it may be important that different types of data be logically separated and may not interact with each other (i.e., between multiple security domains). Separating the data may ensure that data sets and applications remain isolated from one another, protected from bad actors, and/or maintain their integrities. Data segregation may also be an important aspect of ensuring data security.

Data segregation and/or data filtration may be configured based on organizational policy, a user preference/configuration, one or more different security levels, sensitivity of the data, use/purpose of data, implicit/explicit attributes of the data, and/or the like. Data described herein may include, but is not limited to data sets, user credentials, command(s), executable(s), request(s) and/or instruction(s) for one or more tasks (e.g., applications or processes) receiving the request(s) and/or the instruction(s) may be able to execute.

Data may be shared between many different locations (e.g., within a single device and/or between multiple devices). Ensuring data segregation during transit and processing may be desirable for the reasons mentioned above. One or more domains may send and receive data (e.g., such as instructions, commands, executables, and/or the like) between one another. Internet of thing (IoT) devices, devices in a dispersed network(s), devices in a network with different security levels, and/or within a single device may need to send and receive data to and from appropriate devices and/or appropriate domains. For example, IoT devices and/or devices in a dispersed network(s) may communicate with one another to integrate together in a network and each device may have varying security levels. Improper and/or inaccurate transfer of data between data domains and/or processing units (e.g., between devices in a dispersed network(s) and/or within a single device) may pose number of risks as data may end up at an incorrect destination and be exposed and/or become available to the wrong domain(s). Security concerns exist to safely and correctly receive and send data (e.g., instructions, commands, executables, and/or the like) between different domains. A cross domain filtration and segregation system may be configured between data domains (e.g., and/or associated processing units) considering size, weight, and power constraints. A cross domain filtration and segregation system that is capable of backward compatible may be considered. For example, a cross domain filtration and segregation system may be configured so that the cross domain filtration and segregation system may be implemented instead of or in addition to an existing system.

SUMMARY OF THE INVENTION

Systems, methods, and instrumentalities are disclosed for storing, processing, and transmitting different types of data across various data domains. Each domain (e.g., each security domain) may be associated with a specific type of data and the type of data may be characterized based on one or more security requirements, data use, user access, classification level, and/or the like. Techniques for filtering and segregating data to be exposed across one or more different data domains may be used in order to allow data of different types of to be communicated, processed, and/or stored without adversely exposing data in such a way as to violate data domain requirements.

For example, cross domain filtering and processing techniques may be implemented in a multi-processor environment (e.g., a multicore processing unit environment). The multicore processing unit may be configured to process data from a plurality of domains, for example by assigning different cores to different domain data. A computing device implementing the techniques described herein may include a memory management controller, such as a memory management unit (MMU), and a multicore processor. The MMU and the multicore processor may be implemented in a single-package integrated circuit. Configuration(s) described herein may implement a multi-order failure resistant data isolation and cross domain filtration and segregation system for two or more domains by providing directionality (e.g., unidirectionality) to data transfer between domains and providing filters to ensure that data is originating from and destined to proper domains. The MMU described throughout the specification may be an example of a memory management controller that is configured to perform logical separation of domains as described herein.

A multiprocessor system may be configured to operate on data associated with a plurality of data domains. For example, data domains may be associated with a relative security levels of the data (e.g., high security domain, medium security domain, low security domain, etc.). A data domain may be assigned or associated with one or more of the processors of the multiprocessor system. For example, each domain on which the multiprocessor system operates may be assigned or may be operated on a specific processor of the multiprocessor system (e.g., data domain A may be processed by Processor A, data domain B may be processed by Processor B, data domain C may be processed by Processor C, etc.). In an example, one or more of the processors may be used to implement a cross domain filtration and segregation system (CDS). The CDS may be configured to implement one or more rules for filtering and/or segregating data to be passed across a data domain boundary. A MMU may be configured to implement rules related to physical memory access by tasks or processes executed on the different processors in order to ensure proper data segregation across domains. The MMU may be implemented as a common MMU (e.g., a single common MMU) that services each of the processors and/or may be implemented as multiple MMUs where different processors are served by different MMUs. For example, each processor may be served by its own dedicated MMU. As described herein, the MMU(s) may be an example of a memory management controller. The MMU(s) may be replaced with or combined with a hardware and/or a software to perform logical separation of the domains.

For example, the system may be implemented in an integrated circuit including a multicore processor. The multicore processor may have two or more processors that are each configured to implement a set of one or more applications and/or processes (e.g., associated with different data domains). Data may be sent from a first domain to a second domain. A first processor (e.g., associated with the first domain) may include an egress filter task. The egress filter task may process data that is going to exit the first domain (e.g., via egressing). A second processor may be configured to implement a CDS and may include one or more cross domain filter tasks. One or more cross domain filter tasks implemented by the second processor may operate on data processed by the egress filter task of the first processor. The one or more cross domain filter tasks may filter the data and make it available to an ingress filter task implemented on a third processor. The third processor may be associated with a second domain.

The first processor may process data to be transfer (e.g., candidate data) to other processors (e.g., one or more other domains). The first processor may process the data via the egress filter task. The MMU may be configured to allow (e.g., explicitly allow) the egress filter task to write the data to a segregated physical memory location. The MMU may be configured to block other applications and/or processes other than predefined applications or processes from accessing the segregated physical memory location. For example, the egress filter task operating on the data in the first processor and one or more of the cross domain filter tasks operating on the second processor may be allowed to access the segregated physical memory location for data that is exfiltrating the first domain. The MMU may be configured to block or otherwise disallow one or more processes and/or tasks other than the egress filter task operating on the data in the first processor and one or more of the cross domain filter tasks operating on the second processor from accessing and/or modifying data in the segregated physical memory location for data that is exfiltrating the first domain.

The second processor may process the data by perform filtering via one or more cross domain filter tasks. The MMU may be configured to allow (e.g., explicitly allow) the one or more cross domain filter tasks to read the data from the segregated physical memory location (e.g., a first segregated physical memory location) and write to another segregated physical memory location (e.g., a second segregated physical memory location). For example, the MMU may allow the one or more cross domain filter tasks to write data to a segregated physical memory location for infiltrating data into a second domain.

The third processor may process the data that is being infiltrated into the second domain via an ingress filter task. The MMU may be configured to allow (e.g., explicitly allow) the ingress filter task to read from the other segregated physical memory location (e.g., second segregated physical memory location). The MMU may be configured to block or otherwise disallow one or more other applications, processes, and/or tasks other than the ingress filter task executed on the third processor and/or the one or more cross domain filter tasks from accessing the data to/from the second segregated physical memory location.

The egress filter task associated with the first processor and the ingress filter task associated with the third processor may be configured to provide unidirectionality of data transfer between separate domains associated with different processors. The one or more cross domain filter tasks associated with the second processor may be configured to provide a layer of security and a multi-order failure resilient approach to ensure unidirectionality of data transfer described herein and providing data separability.

The one or more cross domain filter tasks associated with the second processor may include one or more cross domain ingress tasks and one or more cross domain egress tasks that are configured to process the data (e.g., data transfer between domains). For example, each domain being processed by the CDS may have an associated cross domain ingress task and cross domain egress task for that domain. The one or more cross domain filter tasks may include one or more filter tasks to perform filtering on the data. The filter tasks may be specific to a given domain and/or specific to a boundary between two or more domains.

The MMU may be configured to allow (e.g., explicitly allow) the cross domain ingress task for a given domain to read the data from a segregated memory location associated segregated physical memory location used for egressing data from a domain processor. The MMU may be configured to allow (e.g., explicitly allow) the cross domain egress task to write the data to the second segregated physical memory location used for ingressing data to a domain processor. The filter task may be configured to determine whether the data is allowed to egress to a second domain associated with a destination domain (e.g., the third processor). If the filter task determines that the data is allowed to egress to the second domain, the filter task may allow the data to egress to the second domain. If the filter task determines that the data is not allowed to egress to the second domain, the filter task may block the data egressing to the second domain.

One or more processors (e.g., the third processor) ingressing data from other processor (e.g., the first processor) may egress data to one or more other processors (e.g., the first processor). For example, the third processor may implement an egress filter task and may process another data (e.g., second data) via the egress filter task. The MMU may be configured to allow (e.g., explicitly allow) the egress filter associated with the third processor to write the data (e.g., second data) to the second segregated physical memory location. The one or more cross domain filter tasks may perform filtering on the data (e.g., the second data from the third processor). The MMU may be configured to allow (e.g., explicitly allow) the one or more cross domain filter tasks to read from the second segregated physical memory location and write to the first segregated physical memory location. The first processor may implement an ingress filter task and may process the data (e.g., the second data) via the ingress filter task. The MMU may be configured to allow (e.g., explicitly allow) the ingress filter task to read the data (e.g., the second data) from the first segregated physical memory location.

In an example, cross domain segregation may be implemented without use of a dedicated processor for cross domain filtration. For example, the egress filter of a given domain/processor may provide data (e.g., after the given domain/processor egress processing) directly to a segregated physical memory region that is also accessible by an ingress filter task of a second domain/processor. The MMU may allow the egress filter task of the first processor and the ingress filter task of the second processor to access the segregated memory region. For example, the MMU may allow the egress filter task of the first processor to write data to the segregated physical memory region and may allow the ingress filter task of the second processor to read the segregated memory region. The MMU may block one or more other tasks and/or processes from accessing the segregated physical memory region.

In an example, the MMU associated with the multiprocessor system may be omitted. For example, the multiprocessor system may implement rules related to physical memory access task or process executed on the different processors (e.g., to ensure proper data segregation across domains). For example, a hardware(s) and/or software(s) may be configured to provide control of the read and write capability to/from physical memory addresses in a multiprocessor system (e.g., similar to or same as the MMU).

BRIEF DESCRIPTION OF THE DRAWINGS

FIG. 5 illustrates an exemplary diagram of logical data flow as described herein.

DETAILED DESCRIPTION

Figure 1:
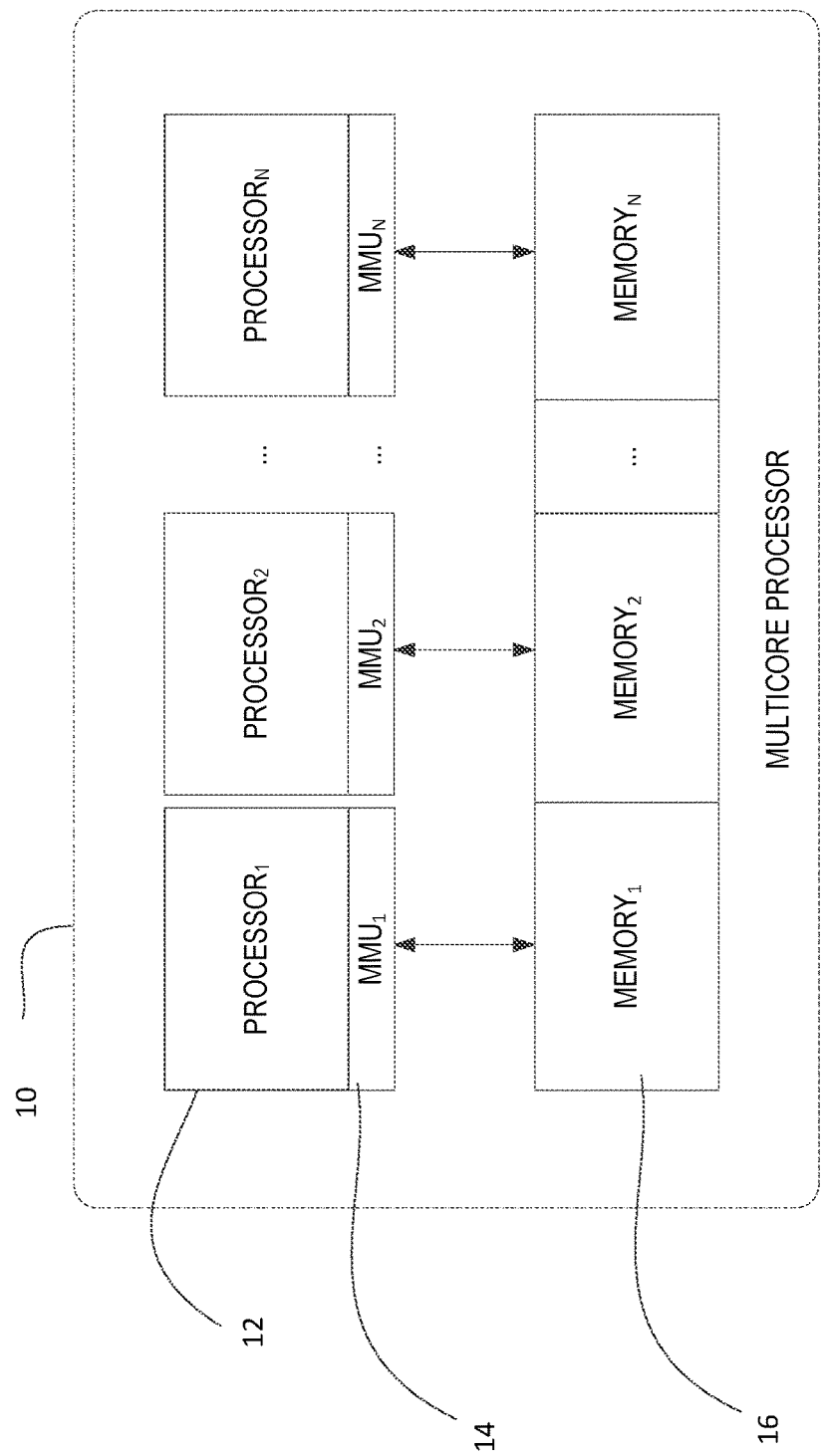
FIG. 1 illustrates an example of a multicore processing unit.

A detailed description of illustrative embodiments will now be described with reference to the various Figures. Although this description provides a detailed example of possible implementations, it should be noted that the details are intended to be exemplary and in no way limit the scope of the application.

A cross domain filtration and segregation system may allow for the interaction of disparate data domains and/or different processing units (e.g., CPUs or processors). Disparate data domains and/or different processing units may have different security and/or sensitivity levels. The cross domain filtration and segregation system may ensure that a system security policy is enforced consistently and correctly so that data crosses domains when explicitly allowed by the system security policy (e.g., via one or more of an ingress filter task, an egress filter task, and/or one or more cross domain filter tasks as described herein). Isolated processing domains may be useful when combined with a cross domain filtration and segregation system to allow the processing of data within disparate domains and the exchange of data between those domains.

In examples, data domains may have different security and/or sensitivity levels. Data from one domain may be accessed from or communicated to another one or more domains that may have different security and/or sensitivity levels. That is, cross domain filtration and segregation system may be used to transfer data from one domain to another domain(s). For example, a first domain may have a higher security and/or sensitivity level than a second domain. Data from the first domain may be egressed to the second domain via the cross domain filtration and segregation system described herein. The cross domain filtration and segregation system may perform cross domain transfer to egress and/or ingress data from the first domain to the second domain consistently, safely, and correctly.

In examples, multiple domains may send and receive instructions (e.g., commands, executables, and/or the like) between one another. For example, internet of things (IoT) devices, devices in a dispersed network(s), devices in a network with varying securities and/or sensitivity levels may need to send and receive commands and/or executables from appropriate devices. Similar to cross domain data transfer, security concerns exist to safely and correctly receive and send instructions (e.g., via commands, executables, and/or the like) between different domains.

An integrated circuit(s) (e.g., a single-package integrated circuits) may include multiple central processing units (CPUs) and may include Memory Management Unit (MMU). Size, weight, and/or power may be improved by condensing the processing for a disparate domain(s) and a cross domain filtration and segregation system(s). A multi-order failure resilient approach may be configured while condensing the processing for the disparate domain(s) and the cross domain filtration and segregation system(s).

In an example, the multiprocessor cross domain filtration system may be implemented on an integrated circuit using a multi-core processor. For example, to allow the systems described herein to be added to an existing data processing and communication system, the size, weight, and power requirements of the system may be considered. By using a multicore processor implemented on an integrated circuit, the cross domain filtration and segregation system may be added to the existing network hardware, data busses, and/or other electronic equipment.

A skilled person in the art will realize that the domain used throughout the specification may refer to any data or applications to be segregated (e.g., via security policy administered by a processing unit such as a CPU). A domain processing may be performed in a processing unit (e.g., CPU). For example, the domain processing may be performed across multiple processing units (e.g., CPUs), within a dedicated processing unit (e.g., a single CPU), and/or within a logical compartment of a processing unit (e.g., a single CPU). The domain and domain processer (or the like) may be used interchangeably herein. The filters described herein (e.g., egress filter and/or ingress filter) may be or may include security policy filters (e.g., security policy egress filter and/or security policy ingress filter). As an example, the security policy filters may be or may include a hardware and/or a software that performs a content verification, a content inspection (e.g., to verify the content complies with the security policies), malicious content inspection (e.g., detecting/evaluating the content for malicious code and/or sandboxing suspicious activity in the content), and/or content sanitization.

Systems, methods, and instrumentalities are disclosed for cross domain filtration and segregation system for multicore processor. A computing device may include a MMU and a multicore processing unit. The MMU and the multicore processor may be in a single-package integrated circuits. Multicore processor may also include, but not limited to a network processor, a virtual machine processor, a field-programmable gate array, and/or the like that has a multicore processing unit (e.g., multicore processors). Configuration(s) described herein may implement a multi-order failure resistant data isolation and cross domain filtration and segregation system for two or more domains by providing unidirectionality for data transfer between different domains and providing filters to ensure that data is originating from and destined to proper domains.

The multicore processing unit may have two or more processors that are configured to implement a set of one or more applications and/or processes. A first processor may implement an egress filter task. A second processor may implement one or more cross domain filter tasks. A third processor may implement an ingress filter task.

The first processor may process data to be transfer to one or more other processors (e.g., one or more other domains). The first processor may process the data via the egress filter task. The MMU may be configured to allow (e.g., explicitly allow) the egress filter task to write the data to a segregated physical memory location. The MMU may be configured to block other applications and/or processes other than the egress filter task from accessing the data from the segregated physical memory location.

The second processor may process the data by perform filtering via one or more cross domain filter task. The MMU may be configured to allow (e.g., explicitly allow) the one or more cross domain filter tasks to read the data from the segregated physical memory location (e.g., a first segregated physical memory location associated with the first processor) and write to another segregated physical memory location (e.g., a second segregated physical memory location associated with the third processor).

The third processor may process the data via the ingress filter task. The MMU may be configured to allow (e.g., explicitly allow) the ingress filter task to read from the other segregated physical memory location (e.g., second segregated physical memory location). The MMU may be configured to block other applications and/or processes other than the ingress filter task from accessing the data from the segregated physical memory location.

The egress filter task associated with the first processor and the ingress filter task associated with the third processor may be configured to ensure unidirectionality of data transfer between separate domains associated with different processors. The one or more cross domain filter tasks associated with the second processor may be configured to provide a layer of security and a multi-order failure resilient approach to ensure unidirectionality of data transfer described herein and enforcing data separation.

The one or more cross domain filter tasks associated with the second processor may include a cross domain ingress task and a cross domain egress task that are configured to process the data (e.g., data transfer between domains). The one or more cross domain filter tasks may include a filter task to perform filtering on the data. The MMU may be configured to allow (e.g., explicitly allow) the cross domain ingress task to read the data from the first segregated physical memory location (e.g., associated with the first processor). The MMU may be configured to allow (e.g., explicitly allow) the cross domain egress task to write the data to the second segregated physical memory location. The filter task may be configured to determine whether the data is allowed to egress to a second domain associated with a destination domain (e.g., the third processor). If the filter task determines that the data is allowed to egress to the second domain, the filter task may allow the data to egress to the second domain. If the filter task determines that the data is not allowed to egress to the second domain, the filter task may block the data egressing to the second domain.

Unidirectionality of data transfer described herein may be implemented in another direction using one or more different filters. For example, the third processor may implement an egress filter task and may process another data (e.g., second data) via the egress filter task. The MMU may be configured to allow (e.g., explicitly allow) the egress filter associated with the third processor to write the data (e.g., second data) to the second segregated physical memory location. The one or more cross domain filter tasks may perform filtering on the other data (e.g., second data from the third processor). The MMU may be configured to allow (e.g., explicitly allow) the one or more cross domain filter tasks to read from the second segregated physical memory location and write to the first segregated physical memory location. The first processor may implement an ingress filter task and may process the data (e.g., second data) via the ingress filter task. The MMU may be configured to allow (e.g., explicitly allow) the ingress filter task to read the data from the first segregated physical memory location.

FIG. 1 illustrates an example of a multicore processing unit. For example, a multicore processing unit 10 may include one or more processors 12, memory management units (MMUs) 14 associated with each of the processors 12, and a memory 16 that may be partitioned (e.g., logically and/or physically partitioned) into one or more memory portions. In examples, the one or more processors 12 may share one MMU (not shown). The multicore processing unit 10 may be a computing device(s) capable of performing processing tasks (e.g., via one or more applications or processes). Although the examples set forth herein may be described in terms general purpose and/or multicore computers, the systems and methods disclosed herein may be equally applicable to any computing devices or for which cross domain filtration and segregation system is desired. For example, the systems and methods disclosed herein may be applicable for providing cross domain filtration and segregation system in multiprocessor system for cell phones, pagers, personal computers (PCs), laptops, vehicles, kiosks, facilities, servers, workstations, tablets, smartphones, routers, controllers, microcontrollers, and/or any other processing and/or communication devices having multicore processing unit.

Processors 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s) or process(es), and/or any other functionality that enables the use of cross domain filtration and segregation system of one or more applications and/or processes.

MMU 14 may be a computer hardware component that handles memory and caching operations associated with the processors 12. Generally, the MMU is responsible for memory management and acts as an interface between applications and processes operating on processors 12 and the physical memory locations on which data is stored, for example in memory 16. MMU 14 may be integrated into the processors 12, although in some systems it may be implemented via a separate integrated circuit. MMU 14 may be configured to perform hardware memory management, which oversees and regulates the use of volatile and/or non-volatile memories (e.g., random access memory (RAM), flash, and/or the like) and/or cache memory by processors 12. MMU 14 may associate (e.g., define) the mapping between logical memory addresses known to the processor applications and the physical memory addresses known only to the MMU 14 and the memories 16 (e.g., physical memory components). MMU 14 may be configure to implement operating system (OS) memory management, which ensures the availability of adequate memory resources for the objects and data structures for tasks and processes. MMU 14 may be configured to implement application memory management, which allocates memory to tasks and executables. In this manner, MMU 14 may control the memory access for different tasks and processes being implemented via processors 12. MMU 14 may be configured with fine-grained separate read and/or write permissions for one or more (e.g., all) physical memory addresses implemented in the system. The MMU described throughout the specification is being used as an example of a memory controller MMU 14 may be or may include one or more MMU portions or units. As described herein, MMU 14 may be configured to connect virtual address associated with each processors and memory 16 (e.g., physical memory address). For example, the MMU 14 may provide virtual address memory locations for one or more applications and/or processes and may assign corresponding physical memory location to associated memory 16. The MMU may be associated with (e.g., attached to) a processor (e.g., CPU) for memory access control. The MMU may be or may include Memory Protection Unit (MPU).

In examples, the MMU described throughout the specification may be replaced with a component, such as a hardware component and/or a software component. For example, the MMU may be replaced with a memory management controller. The memory management controller may be configured to perform logical separation of data between domains as described herein. In examples, the memory management controller may be a hardware component (e.g., such as a MMU) and/or a software component (e.g., such as a hypervisor).

A hypervisor may perform logical separation of data between domains. For example, a hypervisor may be used to control memory access in a manner similar to the MMU. In some examples where physical hardware separation is not desired or necessary, the hypervisor may be configured to perform one or more of the functions described herein as functions performed by the MMU. A hypervisor may be implemented via software between the processor and the Cache (e.g., MMU and/or memory). In examples, a hypervisor(s) may be configured between the applications and/or tasks and the memory and may restrict memory access based on requesting task and/or address (i.e., similar to the MMU) by itself and MMU may be omitted. In examples, a hypervisor may be configured between the applications and/or tasks and the MMU. For example, the MMU may be augmented with a hypervisor(s) and restrict memory access based on requesting task and/or address as described herein. Since the MMU is implemented in hardware, use of the MMU to restrict memory access may provided increased security and data segregation in some applications. However, use of a hypervisor rather than an MMU is also contemplated, for example where there is less of a need for strict data segregation. Thus, examples of MMU operation described throughout the specification may be implemented wholly or in combination of with a hypervisor(s), or be replaced with a hypervisor(s) or a memory management controller that logically separates data between domains. However, use of only a hypervisor may not be sufficient for all types of data separation application (e.g., when extremely sensitive data is being quarantined and the highest levels of security are desired).

Memory 16 may be or may include volatile and/or non-volatile memory. Memory 16 may be or may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), programmable read-only memory (PROM), electronically programmable read-only memory (EPROM), electrically erasable read-only memory (EEPROM), flash memory, FerroElectric RAM (FeRAM), magneto resistive RAM (MRAM), phase change memory (PCM), magnetic core memory, and/or the like. Memory 16 may be configured to store computer readable instructions that when implemented by corresponding processors 12 may cause corresponding processors 12 to implement one or more of the functions or procedures described herein. For example, memory 16 may be configured to store software code implemented by processors 12 that instantiate a restricted operating system environment for operation of the sandboxed browser and/or other sandboxed applications(s) and/or process(es). The software may implement cross domain filtration and segregation system to limit access (e.g., egress and/or ingress) to one more data between domains (e.g., processors associated with each domains). For example, the applications and/or processes operating within each processors may be permitted to access certain portions of memory 16 but may not be allowed access to other portions of memory 16. As an example, MMU 14 may configure memory 16 to be partitioned (e.g., by assigning physical memory location in the memory 16) into a first memory space (e.g., a $memory_1$), a second memory space (e.g., a $memory_2$), and so on. The first memory space may be configured to enable storage and/or operation of a first processor (e.g., a $processor_1$) and to execute a first set of one or more applications and/or processes running on the first processor of the multicore processing unit 10. The second memory space may be configured to enable storage and/or operation of a second set of one or more applications and/or processes running on the second processor (e.g., $processor_2$). As described herein, one or more processors may have an ingress filter task(s) and/or an egress filter task(s) to limit control data to and from domains via a cross domain filtration and segregation system(s). The MMU 14 may enforce the segregation (e.g., physical segregation) between memory spaces (e.g., the first memory space and the second memory space).

Figure 2:
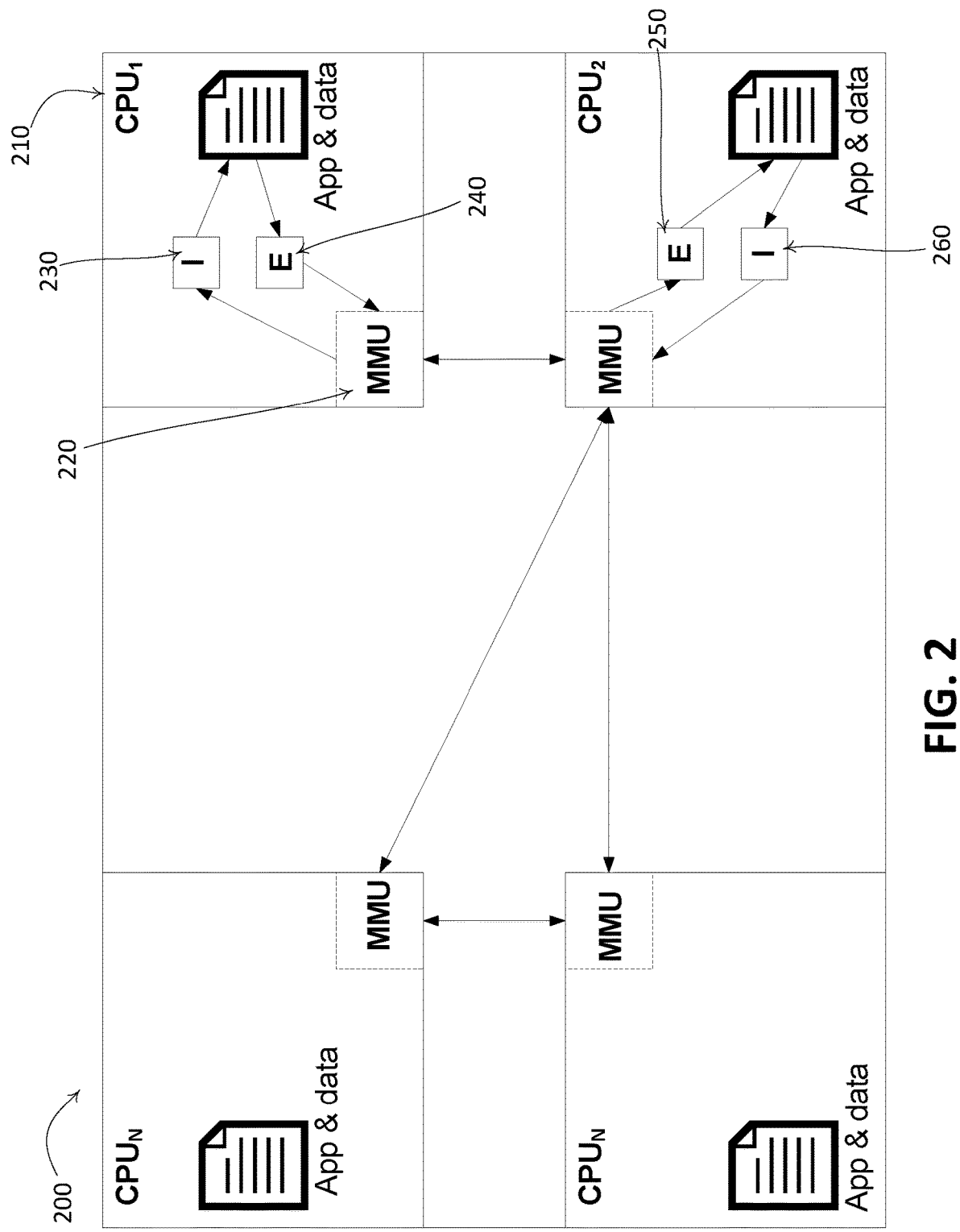
FIG. 2 illustrates an example diagram of a multicore processing unit with a cross domain filtration and segregation system and multiple domains configured by respective processors.

FIG. 2 illustrates an example diagram of a multicore processing unit with a cross domain filtration and segregation system and multiple domains configured by respective processors. For example, the computing device 200 may include a multicore processors 210 and MMU 220. A computing device 200 described herein may be personal computers (PCs), laptops, vehicles, kiosks, facilities, servers, workstations, tablets, smartphones, internet of things (IoT) devices, and/or the like with multicore processing unit. The multicore processing unit may be in a single-package integrated circuit with multiple central processing units (CPUs).

Multicore processors 210 may be or may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The multicore processors 210 may perform data processing, execute application(s) via one or more of applications and/or processes associated with respective processors.

As shown in FIG. 2, the multicore processors 210 may have multiple processors (e.g., CPUs), each configured to implement one or more applications or processes. For example, a first processor may be configured to implement a first set of one or more applications and/or processes. The first set of the one or more applications or processes may be associated (e.g., associated only) with the first processor. A second processor may be configured to implement a second set of one or more applications or processes. The second set of the one or more applications or processes may be associated (e.g., associated only) with the second processor. A third processor may be configured to implement a third set of one or more applications or processes. The third set of the one or more applications may be associated (e.g., associated only) with the third processor. One or more processors may be or may be allocated to (e.g., and/or associated with) one or more domains. One or more processors may be assigned to (e.g., associated with) one or more logical domains. For example, a first processor may be or may be assigned to (e.g., and/or associated with) a first domain (e.g., a first logical domain), a second processor may be or may assigned to (e.g., and/or associated with) a second domain (e.g., a second logical domain), and so on. One or more domains may be associated with separate data domains. The one or more domains may map between data domains and one or more processors (CPUs). For example, as described herein, a domain (e.g., a data domain) may be associated with or assigned to a processor (e.g., CPU).

MMU 220 may configure segregated physical memory location for each of the processors. For example, MMU 220 may configure segregated physical memory location for each set of one or more applications or processes associated with the corresponding processors. For example, MMU may configure to allow the one or more applications or processes to access the segregated physical memory location. Accessing data may include reading the data from the segregated physical memory location, e.g., via using read permissions. Accessing data may include writing to the segregated physical memory location, e.g., via using write permissions. MMU may configure segregated physical memory location for applications or processes associated with each of the multiprocessors. For example, MMU may configure a first segregated physical memory location for a processor (e.g., CPU 1 or a first processor) and configure a second segregated physical memory location for another processor (e.g., CPU 2 or a second processor), and so on. The first and the second segregated physical memory location may be located in a memory associated with the computing device. The first and the second segregated physical memory location may be physically separated and may be in a different location in the memory (e.g., different physical memory address ranges), and the MMU(s) may be configured to allow/disallow (e.g., explicitly allow/disallow) reading and/or writing operations between the processors (e.g., the first and the second processors) and the physical memory locations (e.g., the first and/or the second segregated physical memory locations). The MMU may also allow/disallow read/write operations between applications or processes within a processor and a particular physical memory address ranges associated with the processor. MMU may be configured to block other processors from accessing different segregated physical memory location, unless MMU explicitly allows such access (e.g., an egress filter task, an ingress filter task, and/or a cross domain filter task described herein). A skilled person in the art will realize that egress used throughout the specification may refer to transmit, and egress and transmit may be used interchangeably. A skilled person in the art will realize that ingress used throughout the specification may refer to receive, and ingress and receive may be used interchangeably.

One of the multicore processors (e.g., CPU 1 or a first processor) may have an egress filter task 240 as one of a first set of the applications or processes. The egress filter task 240 may process data originating from the first processor destined to one or more other processors (e.g., other domains). MMU may allow the egress filter task 240 to write the data to a segregated physical memory location (e.g., dedicated to the egress filter task). For example, the MMU may be configured to allow (e.g., explicitly allow) the egress filter task to only write the data to the segregated physical memory location. The MMU may block any processes other than writing the data to the segregated physical memory location. The MMU may block other applications and/or processes other than the egress filter task associated with the first processor from accessing the data from the segregated physical memory location. For example, as shown in FIG. 2, the MMU 220 may keep the memory used by the ingress filter task 230 isolated from the memory used by the egress filter task 240 and/or other applications or processes, even though the ingress filter task 230, the egress filter task 240, and/or other applications or processors are running on the same processor (e.g., $CPU_1$). The MMU 220, as shown in FIG. 2, may also keep the memory used by the egress filter task 240 isolated from the memory used by the ingress filter task 230 and/or other applications or processes, even though the ingress filter task 230, the egress filter task 240, and/or the other applications or processors are running on the same processor (e.g., $CPU_1$). Accessing data may include reading the data from the segregated physical memory location or writing to the segregated physical memory location.

The egress filter task may be software (e.g., executable software). The egress filter task may enforce a system security policy. As described herein, the egress filter task may be configured to disallow (e.g., explicitly disallow) egressing of data from a domain associated with a processor into other domain (e.g., memory associated with other domain) associated with other processor(s). The egress filter task may allow egressing the data from a particular domain to another domain if one or more domain filter rules for that particular domain allow (e.g., explicitly allow) the candidate data to egress to other domain(s). If the one or more domain filter rules explicitly allow egressing the candidate data to other domain(s), the egress filter task may write the candidate data into an assigned location in a memory (e.g., a first segregated physical memory location) via the MMU. The candidate data may include information about a desired destination domain(s) associated with corresponding processor(s) and/or an integrity check value that binds the data to the destination domain information.

Domain filter rule(s) may be a set of filtration rules. For example, domain filter rule(s) may be a set of filtration rules that may be updatable and/or configurable. The domain filter rule(s) may define which data are permitted to ingress (e.g., enter or receive) and/or egress (e.g., exit or transmit) a domain boundary associated with a processor. For example, as described herein, an egress filter task and/or an ingress filter task may use one or more domain filter rules to control directionality of data flow between a domain to another domain. Domain filter rule(s) may limit data transfers based on one or more of the following. Domain filter rule(s) may limit data transfers based on a source domain(s). Domain filter rule(s) may limit data transfers based on a destination domain(s). Domain filter rule(s) may limit data transfers based on length. Domain filter rule(s) may limit data transfers based on one or more of the following: one or more attributes associated with the data, data transfer rate between particular domain pairs (e.g., source/destination), and/or the like. Domain filter rule(s) may limit data transfers based on the data that is attempting to transfer between two domains. Domain filter rule(s) may limit data transfers based on statistical properties of each data item and/or an aggregated statistical summary of data between a source and destination. Domain filter rule(s) may limit data transfers based on date and/or time. Domain filter rule(s) may limit data transfers based on an active operator(s). Domain filter rule(s) may limit data transfers based on external sensor information.

Domain filter rule(s) and/or domain specific rule(s) may be implemented to limit or filter out what data may go through a filter task (e.g., egress filter task or ingress filter task). In examples, domain filter rules(s) and/or domain specific rule(s) may block data from egressing to one or more other domains or ingressing to one or more other domains if the data is determined to be not allowed or not included in one of the allowed/preconfigured domains. Domain filter rule(s) and/or domain specific rule(s) may allow (e.g., only allow) data if the data is destined to appropriate/correct destination (e.g., that may have been preconfigured).

In examples, domain filter rule(s) and/or domain specific rule(s) may modify the data if the data is determined to be not allowed or not included in one of the allowed/preconfigured domains. For example, the domain filter rule(s) and/or domain specific rule(s) may redact one or more (e.g., all) portion of data if the data is egressing to or ingressing from one or more domains that are not allowed. The domain filter rule(s) and/or domain specific rule(s) may allow the data without any modification if the data is going to allowed domains.

In examples, domain filter rule(s) and/or domain specific rule(s) may send an indication (e.g., a security alert or an alarm) if the data is determined to be not allowed to egress or ingress from one or more domains. For example, the domain filter rule(s) and/or domain specific rule(s) may send a security alert or an alarm if the data is not allowed to egress to one or more other domains or if the data is not allowed to ingress from one or more other domains. The domain filter rule(s) and/or domain specific rule(s) may allow the data to process through an egress filter task or an ingress filter task if (e.g., only if) the data is allowed to be egressed or ingressed.

One of the multicore processor (e.g., CPU 2 or a second processor) may have one or more cross domain filter tasks (e.g., an egress filter task 250 and/or an ingress filter task 260). For example, the second processor may be configured to process the data, e.g., that is originating from the first processor, and may perform filtering via one or more cross domain filter tasks. The MMU (e.g., the MMU associated with the second processor) may be configured to allow (e.g., explicitly allow) the one or more cross domain filter tasks to read (e.g., ingress) the data from the segregated physical memory location (e.g., a first segregated physical memory location for ingressing that is associated with the first processor) and write (e.g., egress) to another segregated physical memory location (e.g., a second segregated for egressing physical memory location).

The one or more cross domain filter tasks may include one or more of a cross domain ingress task, a filter task, and/or a cross domain egress task. The cross domain ingress task may be configured to process the data (e.g., data originating from a first processor or the first segregated physical memory location). The MMU may be configured to allow (e.g., explicitly allow) the cross domain ingress task to read the data from the first segregated physical memory location. The filter task may be configured to filtering on the data. Filtering may include one or more of the following. For example, filtering may include packet inspection, field inspection, destination address and/or source address check, payload data check, scanning executable and/or commands, and integrity value check, and/or the like. The cross domain egress task may be configured to process the data (e.g., data originating from the first processor or the first segregated physical memory location).

The cross domain ingress task may be software (e.g., executable software) associated with the one or more cross domain filter task. The cross domain ingress task may detect candidate data in a memory location (e.g., that is associated with a domain M for processor M or the first domain associated with the first processor). The cross domain ingress task may read the data from the detected memory location. The memory location may include candidate data being transferred, information associated with destination domain, and/or an integrity binding value(s). The cross domain ingress task may verify the data, e.g., based on the integrity binding value. The cross domain ingress task may add and/or verify the source information to the detected data. The cross domain ingress task may compute a new integrity binding value over the retrieved/read information (e.g., that may include one or more of data, source, destination, and/or the like). The cross domain ingress task may copy information, such as label and/or tag information, to memory location associated with a destination(s) (e.g., a second segregated physical memory location). The cross domain ingress task may verify the information (e.g., data, source, destination, integrity binding value, and/or the like), that may be stored in the other memory location associated with a destination(s) (e.g., the second segregated physical memory location). The cross domain ingress filter task may overwrite the information (e.g., data, destination, integrity binding value, and/or the like) saved in the first segregated physical memory location (i.e., to erase the information once processed).

The filter task may be software (e.g., executable software). The filter task may enforce a system security policy associated with a processor where the filter task resides (e.g., the second processor). The filter task may disallow transferring of data between the cross domain ingress task filter and the cross domain egress filter task and their associated memory filter location. For example, the filter task may disallow transferring data between the cross domain ingress filter task filter and the cross domain egress filter task if one or more cross domain filter rules disallow (e.g., explicitly disallow) data to move between the domains. The filter task may determine whether the one or more cross domain filter rules allow and/or disallow data to move between the domains based on the information from the label (e.g., source from the label and/or tag), destination attributes, source address, destination address, domain label, and/or the like. If the one or more cross domain filter rules allow the transfer, the filter task may copy the data and other information associated with the data (e.g., label information) from a memory location associated with the ingress filter task to other memory location associated with the egress filter task. For example, as described herein, the MMU may configure a cross domain ingress segregated physical memory location for the ingress filter task and a cross domain egress segregated physical memory location for the egress filter task. The filter task may verify the information copied in the cross domain egress segregated physical memory location (e.g., to make sure that the information is correctly written). The filter task may overwrite (e.g., erase) the information (e.g., such as label information and the data) from the cross domain ingress segregated physical memory location (i.e., to erase the information once processed).

One or more cross domain filter rules may include an updatable set of filtration rules. For example, one or more cross domain filter rules may define (e.g., explicitly define) which data are permitted to cross a set of domain boundaries. The one or more cross domain filter rules may be used by the filter task described herein, e.g., to enforce a system security policy for allowable domain boundary crossings. One or more cross domain filter rules may limit data transfers based on one or more of the following. One or more cross domain filter rules may limit data transfers based on a source domain(s). One or more cross domain filter rules may limit data transfers based on a destination domain(s). One or more cross domain filter rules may limit data transfers based on length and/or size of the data. For example, if a timestamp is configured to cross a domain boundary, the cross domain filter may allow (e.g., only allow) data with less than 48 bits per datagram. One or more cross domain filter rules may limit data transfers based on one or more attributes within the data. For example, attributes may be used to limit and/or filter data that does not have expected attribute value-containing data. If the data does not contain proper and/or expected attributes, the filter rules may apply to filter and/or disallow the data crossing the domain boundaries. One or more cross domain filter rules may limit data transfers based on the rate at which data is attempting to transfer between domains. One or more cross domain filter rules may limit data transfers based on statistical properties of each data item or an aggregated statistical summary of data between a source and destination. One or more cross domain filter rules may limit data transfers based on date and/or time. One or more cross domain filter rules may limit data transfers based on an active operator(s). One or more cross domain filter rules may limit data transfers based on external sensor information.

The cross domain egress filter task may be software (e.g., executable software) associated with one or more cross domain filter tasks. The cross domain egress filter task may detect data in a cross domain egress segregated physical memory location. For example, the cross domain egress filter task may detect data in the cross domain egress segregated physical memory location based on information (e.g., the source information within the label). The cross domain egress filter task may read the data and associated information (e.g., information about the source, integrity binding value, and/or the like). The cross domain egress filter task may verify the integrity binding value. The cross domain egress filter task may copy the data and the associated information (e.g., label information about the source, integrity binding value and/or the like) to a second segregated physical location associated with a second processor. The cross domain egress filter task may verify the data and the associated information (e.g., information about the source, integrity binding value, and/or the like), that is now stored in the second segregated physical memory location. If the cross domain egress filter task determines that the information are correctly stored in the second segregated physical memory location, the cross domain egress filter task may overwrite the data and the associated information (e.g., the source information, integrity binding value, and/or the like) in the cross domain egress segregated physical memory location (i.e., to erase the information once processed).

One of the multicore processor (e.g., CPU 3 or a third processor) may have an ingress filter task. For example, the ingress filter task may be one of the third set of the applications or processes. The ingress filter task may process data originating from other domain (e.g., first processor) via one or more cross domain filter tasks as described herein. MMU may allow the ingress filter task to read the data from the segregated physical memory location (e.g., where the data is being stored after going through one or more cross domain filter tasks described herein such as the second segregated physical memory location). The MMU may block (e.g., or disallow) any processes other than reading the data from the segregated physical memory location (e.g., the second segregated physical memory location). The MMU may block one or more applications and/or processes other than the egress filter task associated with the third processor from accessing the data from the segregated physical memory location. Accessing data may include reading the data from the segregated physical memory location or writing to the segregated physical memory location.

The ingress filter task may be software (e.g., executable software). For example, the ingress filter task may enforce a system security policy associated with the processor. As described herein, the ingress filter task may be configured to disallow (e.g., explicitly disallow) ingressing of data from its particular domain's (e.g., domain M) associated with a processor into other domain (e.g., memory associated with other domain) associated with other processor(s). The ingress filter task may allow ingressing the data from a particular domain to another domain based on one or more domain filter rules for that particular domain allows (e.g., explicitly allows) the candidate data to ingress into that domain. If the one or more domain filter rules explicitly allow ingressing the candidate data to a domain, the ingress filter task may read the candidate data from an assigned location in a memory (e.g., a second segregated physical memory location) via the MMU.

The candidate data may include information about a desired destination domain(s) associated with the corresponding processor(s). The ingress filter task may verify the integrity binding of the source, destination indicator, and/or data. The ingress filter task may use one or more domain filter rules to determine if ingress of the data is allowed (e.g., explicitly allowed). If the one or more domain filter rules do explicitly allow for the ingress of the candidate data, the ingress filter task may remove the source information associated with the candidate data. In examples, the ingress filter task may skip (e.g., omit) removing the source information associated with the candidate data. The ingress filter task may transfer the data from that a particular domain (e.g., that is located in a segregated memory location associated with a particular processor) to a segregated physical memory location associated with the ingress filter task. The ingress filter task may operate on the data (e.g., directly) or may store the data in a second segregated physical memory location (e.g., dedicated to the third processor).

As described herein, MMU may configure one or more segregated physical memory locations associated with each processors/domains. For example, the MMU may configure a first segregated physical memory location for the first processor associated with the egress filter task. The MMU may configure one or more segregated physical memory locations (e.g., a cross domain ingress segregated physical memory location and a cross domain egress segregated physical memory location) for the second processor associated with one or more cross filter tasks. The MMU may configure a second segregated physical memory location for the third processor associated with the ingress filter task. The segregated physical memory locations described herein may be assigned to a memory. The segregated physical memory locations described herein may be separated from one another. For example, the segregated physical memory locations may not share any location in a memory and may be logically separated from one another.

One of the multicore processor (e.g., CPU 3 or a third processor) may have an egress filter task. For example, the egress filter task may be one of the third set of the applications or processes. The egress filter task may process data (e.g., second data) originating from the third processor destined to one or more other processors (e.g., other domains). MMU may allow the egress filter task to write the data to a segregated physical memory location (e.g., dedicated to the ingress filter task). For example, the MMU may be configured to allow (e.g., explicitly allow) the egress filter task to only write the data (e.g., the second data) to the segregated physical memory location. The MMU may block any processes other than writing the data to the segregated physical memory location. The MMU may block other applications and/or processes other than the egress filter task associated with the third processor from accessing the data from the segregated physical memory location. Accessing data may include reading the data from the segregated physical memory location or writing to the segregated physical memory location.

The egress filter task may be software (e.g., executable software). The egress filter task may enforce a system security policy associated with the processor. As described herein, the egress filter task may be configured to disallow (e.g., explicitly disallow) egressing of data from its particular domain (e.g., Domain M) associated with a processor into other domain (e.g., memory associated with other domain) associated with other processor(s). The egress filter task may allow egressing the data from a particular domain to another domain if one or more domain filter rules for that particular domain allows (e.g., explicitly allows) the candidate data to egress to other domain(s). If the one or more domain filter rules explicitly allow egressing the candidate data to other domain(s), the egress filter task may write the candidate data into an assigned location in a memory (e.g., a first segregated physical memory location) via the MMU. The candidate data may include information about a desired destination domain(s) associated with corresponding processor(s) and/or an integrity check value that binds the data to the destination domain information As described herein, one of the multicore processor (e.g., CPU 2 or a second processor) may have one or more cross domain filter tasks. For example, the second processor may be configured to process the data, e.g., the second data that is originating from the third processor, and may perform filtering via one or more cross domain filter tasks. The MMU (e.g., the MMU associated with the second processor) may be configured to allow (e.g., explicitly allow) the one or more cross domain filter tasks to read the data from the segregated physical memory location (e.g., the second segregated physical memory location that is associated with the third processor) and write to another segregated physical memory location (e.g., the first segregated physical memory location).

The one or more cross domain filter tasks may be or may include one or more of a cross domain ingress task, a filter task, and/or a cross domain egress task. The cross domain ingress task may be configured to process the data (e.g., data originating from the third processor or the second segregated physical memory location). The MMU may be configured to allow (e.g., explicitly allow) the cross domain ingress task to read the data from the second segregated physical memory location. The filter task may be configured to filtering on the data (e.g., the second data). Filtering may include one or more of the following. For example, filtering may include packet inspection, field inspection, destination address and/or source address check, payload data check, scanning executable and/or commands, integrity value check, statistical properties of data such as an aggregated statistical summary of data between a source and destination domains and/or the like. The cross domain egress task may be configured to process the data (e.g., data originating from the third processor or the third segregated physical memory location).

Cross domain ingress task filters described herein may use segregated physical memory locations associated with the cross domain ingress task filters, and cross domain egress task filters described herein may use segregated physical memory locations associated with the cross domain egress task filters. In examples, the segregated physical memory locations associated with the cross domain egress and/or ingress task filters may be assigned to specific domains (e.g., that are independent to one another). For example, a first segregated physical memory location may be associated with cross domain transfer described herein between a first domain (e.g., a first CPU) and the cross domain ingress task filters. For example, a second segregated physical memory location may be associated with cross domain transfer described herein between a second domain (e.g., a second CPU) and the cross domain egress task filters, and so on.

In examples, the segregated physical memory locations associated with the cross domain egress and/or ingress task filters may be assigned to common segregated physical memory locations. For example, for cross domain data transfer between two domains, the cross domain ingress filter task may use the segregated physical memory location associated with the cross domain ingress filter task for ingressing as described herein, and the cross domain egress filter task may use the segregated physical memory location associated with the cross domain egress filter task for egressing as described herein. Once the data has been correctly transferred, the cross domain ingress filter task and the cross domain egress filter task may overwrite the information in the segregated physical memory locations associated with the filter tasks (i.e., to erase the information once processed).

The cross domain ingress task may be software (e.g., executable software) associated with the one or more cross domain filter task. The cross domain ingress task may detect candidate data in a segregated physical memory location (e.g., that is associated with a domain M for processor M or the third domain associated with the third processor). The cross domain ingress task may read the data from the detected memory location (e.g., the segregated physical memory location associated with egress and/or ingress filter tasks). The memory location (e.g., the segregated physical memory location) may include candidate data being transferred, information associated with destination domain, and/or an integrity binding value(s). The cross domain ingress task may verify the data, e.g., based on the integrity binding value. The cross domain ingress task may add the source information to the detected data. The cross domain ingress task may compute a new integrity binding value over the retrieved/read information (e.g., that may include one or more of data, source, destination, and/or the like). The cross domain ingress task may copy information, such as label information, to memory location associated with a destination(s) (e.g., the first segregated physical memory location). The cross domain ingress task may verify the information (e.g., data, source, destination, integrity binding value, and/or the like), that may be stored in the other memory location associated with a destination(s) (e.g., the first segregated physical memory location). The cross domain ingress filter task may overwrite the information (e.g., data, destination, integrity binding value, and/or the like) saved in the second segregated physical memory location. For example, the cross domain ingress filter task may overwrite the information in the second segregated physical memory location after the cross domain filter task determines that the data has been correctly transferred (i.e., to erase the information once processed).

The filter task may be software (e.g., executable software). The filter task may enforce a system security policy associated with a processor where the filter task resides (e.g., the second processor). The filter task may disallow transferring of data between the cross domain ingress task filter and the cross domain egress filter task and their associated memory filter location. For example, the filter task may disallow transferring data between the cross domain ingress filter task filter and the cross domain egress filter task if one or more cross domain filter rules allow (e.g., explicitly allow) data to move between the domains. The filter task may determine whether the one or more cross domain filter rules allow data to move between the domains based on the information from the label (e.g., source of the label) and/or destination attributes. If the one or more cross domain filter rules allow the transfer, the filter task may copy the data and other information associated with the data (e.g., label information) from a memory location associated with the ingress filter task to other memory location associated with the egress filter task. For example, as described herein, the MMU may configure a cross domain ingress segregated physical memory location for the ingress filter task and a cross domain egress segregated physical memory location for the egress filter task. The filter task may verify the information copied in the cross domain egress segregated physical memory location (e.g., to make sure that the information is correctly written). The filter task may overwrite (e.g., erase) the information (e.g., such as label information and the data) from the cross domain ingress segregated physical memory location (i.e., to erase the information once processed).

One or more cross domain filter rules may include an updatable set of filtration rules. For example, one or more cross domain filter rules may define (e.g., explicitly define) which data are permitted to cross and define (e.g., explicitly define) a set of domain boundaries. The one or more cross domain filter rules may be used by the filter task described herein, e.g., to enforce a system security policy for allowable domain boundary crossings. One or more cross domain filter rules may limit data transfers based on one or more of the following. One or more cross domain filter rules may limit data transfers based on a source domain(s). One or more cross domain filter rules may limit data transfers based on a destination domain(s). One or more cross domain filter rules may limit data transfers based on length. One or more cross domain filter rules may limit data transfers based on one or more attributes within the data. One or more cross domain filter rules may limit data transfers based on the rate at which data is attempting to transfer between domains. One or more cross domain filter rules may limit data transfers based on statistical properties of each data item or an aggregated statistical summary of data between a source and destination. One or more cross domain filter rules may limit data transfers based on date and/or time. One or more cross domain filter rules may limit data transfers based on an active operator(s). One or more cross domain filter rules may limit data transfers based on external sensor information.

The cross domain egress filter task may be software (e.g., executable software) associated with one or more cross domain filter tasks. The cross domain egress filter task may detect data in a cross domain egress segregated physical memory location. For example, the cross domain egress filter task may detect data in the cross domain egress segregated physical memory location based on source information within the label. The cross domain egress filter task may read the data and associated information (e.g., information about the source, integrity binding value, and/or the like). The cross domain egress filter task may verify the integrity binding value. The cross domain egress filter task may copy the data and the associated information (e.g., information about the source, integrity binding value and/or the like) to a second segregated physical location associated with a second processor. The cross domain egress filter task may verify the data and the associated information (e.g., information about the source, integrity binding value, and/or the like), that is now stored in the second segregated physical memory location. If the cross domain egress filter task determines that the information are correctly stored in the second segregated physical memory location, the cross domain egress filter task may overwrite the data and the associated information (e.g., the source information, integrity binding value, and/or the like) from the cross domain egress segregated physical memory location (i.e., to erase the information once processed).

One of the multicore processor (e.g., the CPU 1 or the first processor) may have an ingress filter task. For example, the ingress filter task may be one of the first set of the applications or processes. The ingress filter task may process data originating from other domain (e.g., third processor) via one or more cross domain filter tasks as described herein. MMU may allow the ingress filter task to read the data from the segregated physical memory location (e.g., where the data is being stored after going through one or more cross domain filter tasks described herein such as the first segregated physical memory location). The MMU may block (e.g., or disallow) any processes other than reading the data from the segregated physical memory location (e.g., the first segregated physical memory location). The MMU may block one or more applications and/or processes other than the egress filter task associated with the first processor from accessing the data from the segregated physical memory location. Accessing data may include reading the data from the segregated physical memory location or writing to the segregated physical memory location.

The ingress filter task may be software (e.g., executable software). For example, the ingress filter task may enforce a system security policy associated with the processor. As described herein, the ingress filter task may be configured to disallow (e.g., explicitly disallow) ingressing of data from its particular domain's (e.g., domain M) associated with a processor into other domain (e.g., memory associated with other domain) associated with other processor(s). The ingress filter task may allow ingressing the data from a particular domain to another domain based on one or more domain filter rules for that particular domain allows (e.g., explicitly allows) the candidate data to ingress into that domain. If the one or more domain filter rules explicitly allow ingressing the candidate data to a domain, the ingress filter task may read the candidate data from an assigned location in a memory (e.g., a first segregated physical memory location) via the MMU.

The candidate data may include information about a desired destination domain(s) associated with the corresponding processor(s). The ingress filter task may verify the integrity binding of the source, destination indicator, and/or data. The ingress filter task may use one or more domain filter rules to determine if ingress of the data is allowed (e.g., explicitly allowed). If the one or more domain filter rules do explicitly allow for the ingress of the candidate data, the ingress filter task may remove the source information associated with the candidate data. The ingress filter task may transfer the data from that particular domain (e.g., that is located in a segregated memory location associated with a particular processor) to a segregated physical memory location associated with the ingress filter task. The ingress filter task may operate (e.g., directly operate) on the data or may store the data in a first segregated physical memory location (e.g., dedicated to the first processor).

Figure 3A:
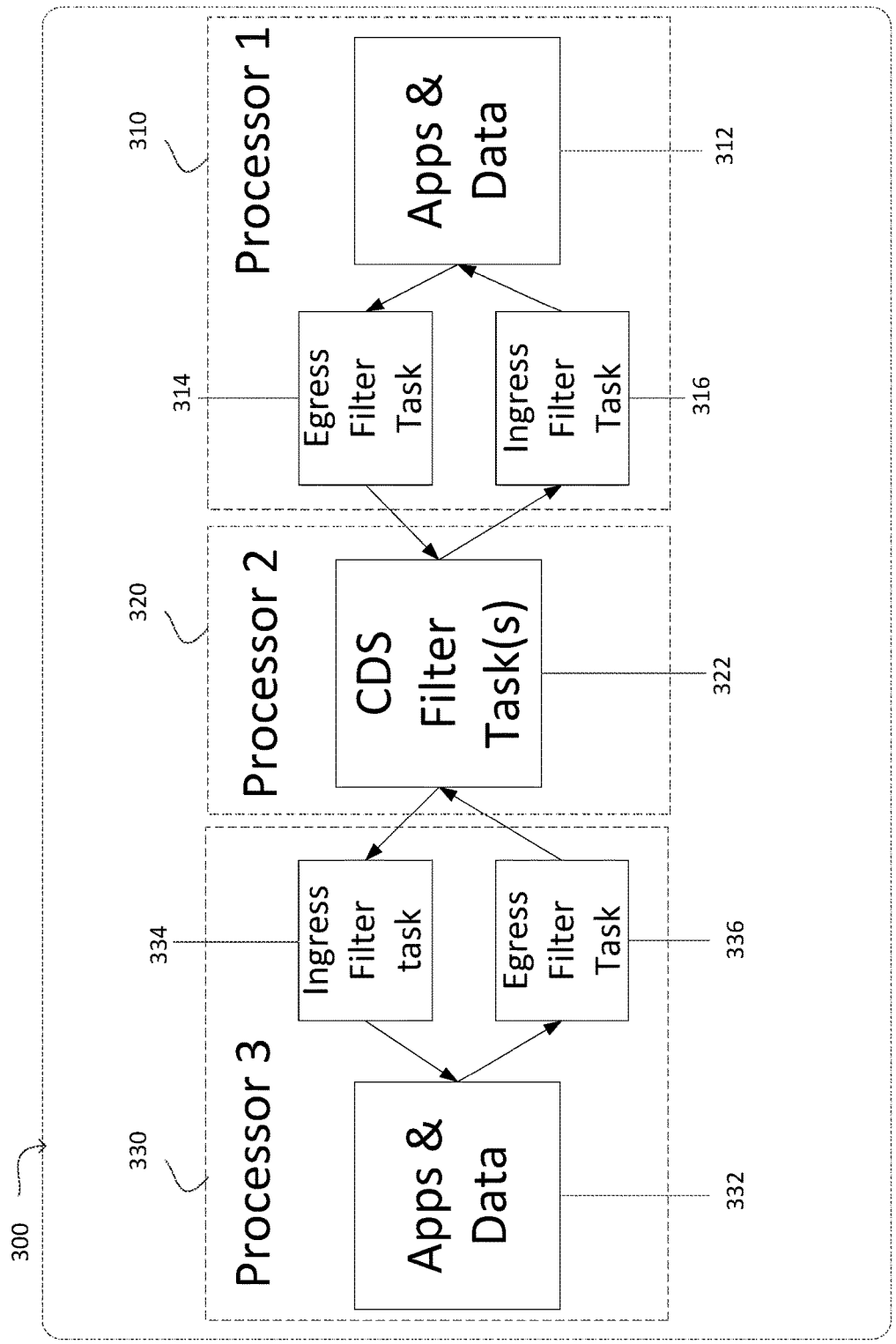
FIG. 3A illustrates an example diagram of logical data flow (e.g., unidirectional logical data flow) in a multicore processing unit with a cross domain filtration and segregation system between two or more processors.

As described herein, cross domain filtration and segregation system (CDS) may be implemented using one or more cross domain filter tasks. The CDS may be implemented in a separate processor (e.g., as shown in FIGS. 2, 3A, and/or 3B). Having a CDS in a separate processor may enhance security and safety for processing data between cross domains (e.g., between two or more processors). As described in FIG. 4, the CDS may be skipped (e.g., omitted) for low risk data and/or low security data. For example, one or more hardware associated with the processors may be shared (e.g., without the CDS in between the processors associated with the one or more hardware).

Figure 3B:
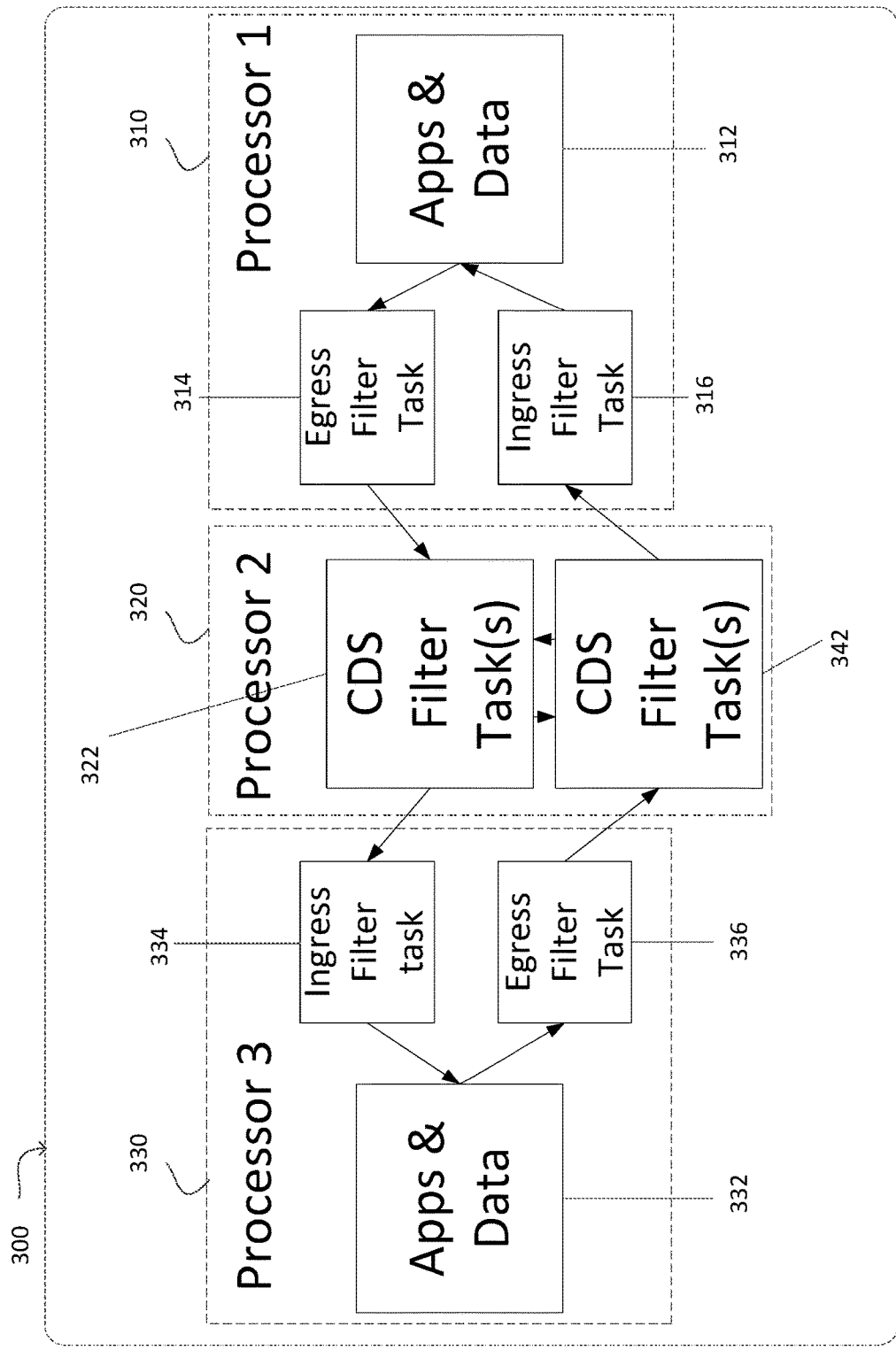
FIG. 3B illustrates an example diagram of logical data flow (e.g., unidirectional logical data flow) in a multicore processing unit with a cross domain filtration and segregation system between each of two or more processors. The cross domain filtration and segregation system may include two or more CDS filter tasks that are separate (e.g., independent) from one another.

FIG. 3A illustrates an example diagram of logical data flow (e.g., unidirectional data flow) in a multicore processing unit 300 with a cross domain filtration and segregation system between two or more processors. FIG. 3B illustrates an example diagram of logical data flow (e.g., unidirectional data flow) in a multicore processing unit 300 with a cross domain filtration and segregation system between two or more processors. The cross domain filtration and segregation system shown in FIG. 3B may include two or more CDS filter tasks that are separate (e.g., independent) from one another. As shown in FIGS. 3A and 3B, a first processor (e.g., domain 1) 310 may implement one or more applications or processes 312. One of the one or more applications or processes 312 may be an egress filter task 314. The first processor 310 may process data (e.g., a first data) via the egress filter task 314. If the data is allowed to egress to one or more other processors (e.g., a second domain associated with a third processor), the egress filter task 314 may allow egressing the data to one or more other processors. If the data is not allowed to egress, the egress filter task 314 may block the data from egressing to one or more other processors. MMU may be configured to allow (e.g., explicitly allow) the egress filter task 314 to write the data to a segregated physical memory location associated with the first processor. For example, the MMU may allow the egress filter task 314 to write the data to a first segregated physical memory location (not shown).

As shown in FIG. 3A, a second processor (e.g., CDS domain) 320 may implement one or more applications or processes 322. For example, the second processor 320 may implement one or more cross domain filter tasks 322. The second processor 320 may perform filtering on the data (e.g., data originating from the first processor, such as the first data) via one or more cross domain filter tasks 322. The one or more cross domain filter tasks 322 may include a cross domain ingress task, a filter task, and/or a cross domain egress task (not shown). The MMU may be configured to allow (e.g., explicitly allow) the cross domain ingress task to read the first data from the first segregated physical memory location. The filter task may perform filtering on the first data. For example, the filter task may determine whether the first data is allowed to egress to one or more other processors (e.g., the second domain associated with the third processor). If the first data is allowed to egress to one or more other processors, the filter task may egress the first data to the one or more other processors. If the first data is not allowed to egress to one or more other processors, the filter task may block the first data from egressing to the one or more other processors. The cross domain egress task may process the first data. The MMU may be configured to allow (e.g., explicitly allow) the cross domain egress task to write the filtered first data to other segregated physical memory location (e.g., a second segregated physical memory location associated with the third processor).

As shown in FIG. 3A, a third processor 330 (e.g., domain 2) may implement one or more applications or processes 332. One of the one or more applications or processes 332 may be an ingress filter task 334, and one of the one or more applications or processes 332 may be an egress filter task 336. The third processor 330 may process data (e.g., a first data) via the ingress filter task 334. For example, if the data is allowed to ingress to the third processors 330, the ingress filter task 334 may allow ingressing the data to the processors. If the data is not allowed to ingress, the ingress filter task 334 may block the data from ingressing to the processors. MMU may be configured to allow (e.g., explicitly allow) the ingress filter task to read the data from a segregated physical memory location. For example, the MMU may allow the ingress filter task 334 to read the data to a second segregated physical memory location (not shown).

As shown in FIG. 3A, logical data flow (e.g., unidirectional data flow) flow may occur from the third processor 330 to the first processor 310 via the second processor 320. For example, the third processor 330 may implement an egress filter task 336 and may process data (e.g., a second data) via the egress filter task 336. The MMU may be configured to allow (e.g., explicitly allow) the egress filter task 336 to write the second data to the second segregated physical memory location associated with the third processor 330. The second processor 320 may perform filtering on the second data using one or more cross domain filter tasks as described herein. The MMU may be configured to allow (e.g., explicitly allow) the one or more cross domain filter tasks to read from the second segregated physical memory location and write to the first segregated physical memory location (e.g., associated with the first processor). The first processor 310 may implement an ingress filter task 316 and may process the second data via the ingress filter task 316. The MMU may be configured to allow (e.g., explicitly allow) the ingress filter task 316 to read the second data from the first segregated physical memory location.

As shown in FIG. 3A, egress filter tasks, ingress filter tasks, and one or more cross domain filter tasks may allow processing of data in disparate processors (e.g., domains) and exchange data between the processors with a multi-order failure resilient approach. For example, if the egress filter task causes an error and allow data to egress from the first processor domain to one or more other domains that is not authorized or allowed, one or more cross domain filter tasks and/or the ingress filter tasks associated with different processors may be able to block unauthorized transfer of data. The likelihood of all filter tasks failing (e.g., failing concurrently) may be low to none and may ensure low risk in data transfer between different domains.

As described herein, FIG. 3B illustrates an example diagram of logical data flow (e.g., unidirectional data flow) in a multicore processing unit 300 with a cross domain filtration and segregation system having two or more CDS filter tasks that are separate (e.g., independent) from one another. As shown in FIG. 3B, the second processor 320 may implement one or more applications or processes 322 and 342. For example, the second processor 320 may implement a first cross domain filter tasks 322 and/or a second cross domain filter tasks 342. As described herein, the first and the second cross domain filter tasks 322 and 342 may be separate (e.g., and independent) from each other, configured to perform filtering on data associated with different domains. For example, the second processor 320 may perform filtering on the data (e.g., data originating from the first processor 310, such as the first data) via the first cross domain filter tasks 322. The first cross domain filter tasks 322 may include a first cross domain ingress task, a first filter task, and/or a first cross domain egress task (not shown). The MMU may be configured to allow (e.g., explicitly allow) the first cross domain ingress task to read the first data from the first segregated physical memory location (e.g., that is associated with the first processor 310). The first filter task may perform filtering on the first data. For example, the first filter task may determine whether the first data (e.g., originating from the first processor 310) is allowed to egress to one or more other processors (e.g., second domain associated with the third processor 330). If the first data is allowed to egress to one or more processors, the first cross domain egress task may egress the first data to one or more other processors (e.g., such as the third processor 330). If the first data is not allowed to egress to one or more other processors, the first cross domain egress task may block the first data from egressing to one or more other processors (e.g., such as the third processor 330).

Similar to FIG. 3A, FIG. 3B may illustrate a third processor 330 (e.g., domain 2). The third processor 330 may implement one or more applications or processes 332. One of the one or more applications or processes 332 may be an ingress filter task 334, and one of the one or more applications or processes 332 may be an egress filter task 336. The third processor 330 may process data (e.g., a first data) via the ingress filter task 334. For example, if the ingress filter task 334 associated with the third processor 330 determines that the data (e.g., the first data) is allowed to ingress from the CDS domain (e.g., that is associated with the CDS filter task 332), the ingress filter task 334 may allow ingressing the data from the first CDS filter tasks 322 to the third processor 334. If the data is not allowed to ingress, the ingress filter task 334 may block the data to ingress from the first CDS filter task 322 to the third processor 330. MMU may be configured to allow (e.g., explicitly allow) the ingress filter task to read the data from a segregated physical memory location. For example, the MMU may allow the ingress filter task 334 to read the data from the segregated physical memory location associated with the first filter task 322 (not shown) to a second segregated physical memory location (not shown).

Similar to FIG. 3A and as shown in FIG. 3B, data flow (e.g., logical data flow) may originate from a third processor 330 to the first processor 310 via the second processor 320. For example, the third processor 330 may implement an egress filter task 336 and may process data (e.g., a second data) via the egress filter task 336. The MMU may be configured to allow (e.g., explicitly allow) the egress filter task 336 to write the second data to the second segregated physical memory location associated with the third processor 330. Similar to the first cross domain filter tasks 322 described herein, the second cross domain filter tasks 342 may include a second cross domain ingress task, a second filter task, and/or a second cross domain egress task (not shown). The second processor 320 may perform filtering on the second data using the second domain filter tasks 342 as described herein. The MMU may be configured to allow (e.g., explicitly allow) the second cross domain filter tasks 342 to read the data from the second segregated physical memory location and write to the first segregated physical memory location (e.g., associated with the first processor) via the first cross domain filter tasks 342 as described herein. The first processor 310 may implement an ingress filter task 316 and may process the second data via the ingress filter task 316. The MMU may be configured to allow (e.g., explicitly allow) the ingress filter task 316 to read the second data from the first segregated physical memory location.

Similar to FIG. 3A and as shown in FIG. 3B, egress filter tasks, ingress filter tasks, and/or the cross domain filter tasks may allow processing of data in disparate processors (e.g., domains) and exchange data between the processors with a multi-order failure resilient approach. For example, if the egress filter task causes an error and allow data to egress from the first processor domain to one or more other domains that is not authorized or allowed, one or more cross domain filter tasks and/or the ingress filter tasks associated with different processors may be able to block unauthorized transfer of data. The likelihood of all filter tasks failing (e.g., failing concurrently) may be low to none and may ensure low risk in data transfer between different domains.

Figure 4:
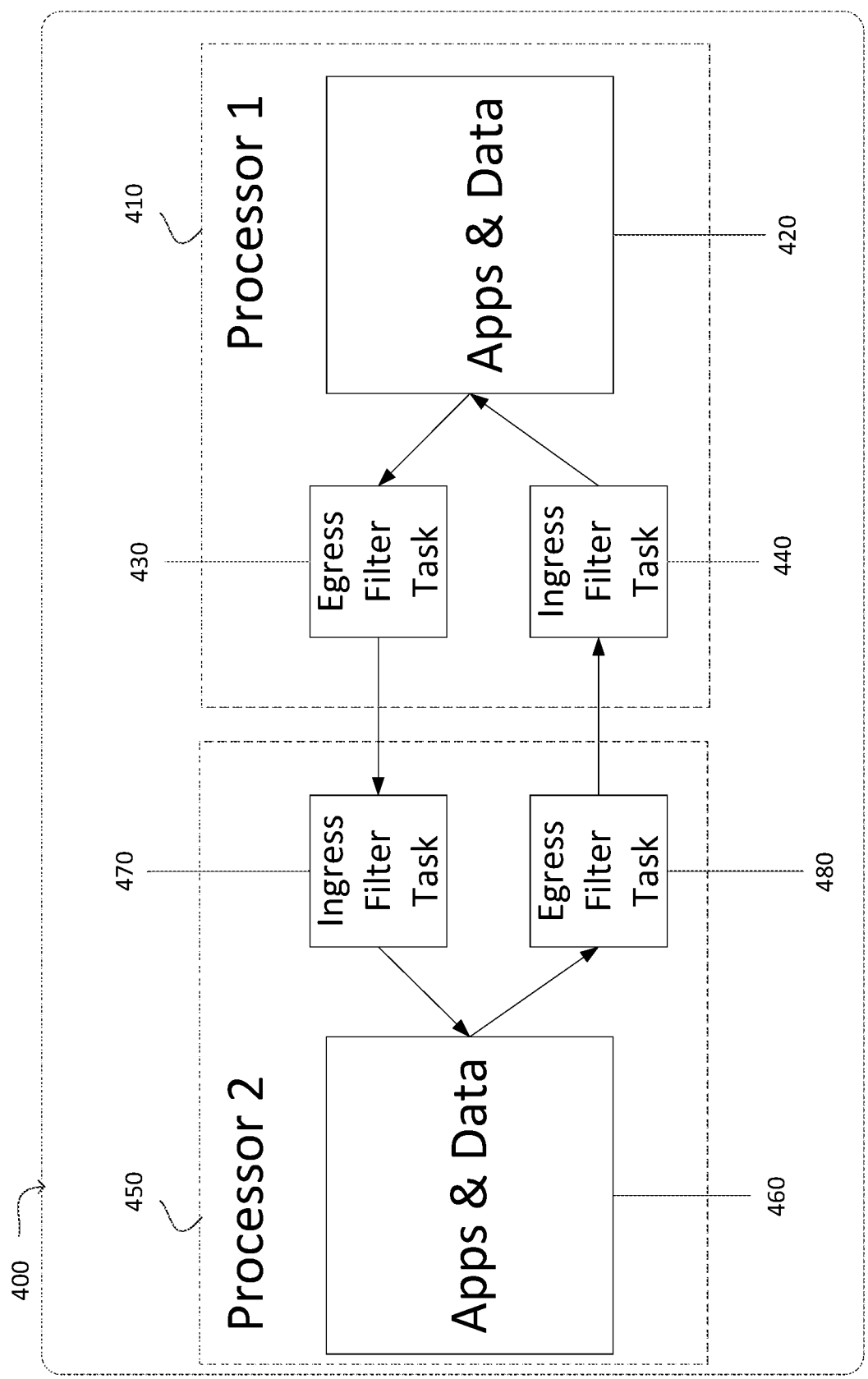
FIG. 4 illustrates an exemplary diagram data flow (e.g., unidirectional data flow) in a multicore processing unit with two or more processors.

FIG. 4 illustrates an example diagram data flow (e.g., unidirectional data flow) in a multicore processing unit 400 with two or more processors. As described herein, a first processor 410 may implement one or more applications or processes 420. One of the one or more applications or processes may be an egress filter task 430. One of the one or more applications or processes may be an ingress filter task 440. The first processor 410 may process data (e.g., a first data) via the egress filter task 430. For example, the first processor 410 may perform filtering on the data via a filter task (not shown). If the filter task determines that the data is allowed to egress to one or more other processors (e.g., a second domain associated with a second processor), the egress filter task 430 may allow egressing the data to one or more other processors. If the filter task determines that the data is not allowed to egress, the egress filter task 430 may block the data from egressing to one or more other processors. MMU may be configured to allow (e.g., explicitly allow) the egress filter task 430 to write the data to a segregated physical memory location associated with the first processor 410. For example, the MMU may allow the egress filter task 430 to write the data to a first segregated physical memory location (not shown).

The filter task may access the data from the first segregated physical memory location. The MMU may be configured to allow (e.g., explicitly allow) the filter task to read from the first segregated physical memory location. The filter task may determine whether the data is allowed to egress to one or more other processors (e.g., a second domain associated with a second processor). If the filter task determines that the data is allowed to egress to the one or more other processors, the first processor may egress the data to the one or more other processors. If the filter task determines that the data is not allowed to egress to the one or more other processors, the first processor may block the data from egressing to the one or more other processors.

A second processor 450 may implement one or more applications or processes 460. One of the one or more applications or processes 460 may be an ingress filter task 470. One of the one or more applications or processes may be an egress filter task 480. The second processor 450 may process data (e.g., the first data from the first processor) via the ingress filter task 470. For example, the second processor 450 may perform filtering on the data via a filter task (not shown). If the filter task determines that the data is allowed to ingress to the second processor 450, the ingress filter task 470 may allow ingressing the data to the second processor. If the filter task determines that the data is not allowed to ingress, the ingress filter task 470 may block the data from ingressing to the second processor 450. MMU may be configured to allow (e.g., explicitly allow) the ingress filter task 470 to read the data from a segregated physical memory location. For example, the MMU may allow the ingress filter task to read the data to a second segregated physical memory location (not shown).

The filter task may access the data from the second segregated physical memory location. The second processor may identify the candidate data that is egressing from the first segregated physical memory location (e.g., via the filter task). The processor (e.g., via the filter task) may determine whether the data is allowed to ingress to the second processor. If the filter task determines that the data is allowed to ingress to the second processor, the second processor may ingress the data to the second processor. If the filter task determines that the data is not allowed to ingress to the second processor, the second processor may block the data from ingressing to the second processor.

MMU may write data (e.g., data from the first processor) to one or more segregated physical memory locations associated with each processor. For example, the MMU may write the first data to a first segregated physical memory location associated with the first processor and a second segregated physical memory location associated with the second processor. The MMU may to block the one or more applications or processes other than the egress filter task or the filter task associated with the first processor accessing (e.g., reading from and/or writing to) the first segregated physical memory location. The MMU may block the one or more applications or processes other than the ingress filter task or the filter task associated with the second processor accessing (e.g., reading from and/or writing to) the second segregated physical memory location.

As shown in FIG. 4, data flow (e.g., logical data flow) may occur from the second processor 450 to the first processor 410. For example, the second processor 450 may implement an egress filter task 480 and may process data (e.g., a second data) via the egress filter task 480. The MMU may be configured to allow (e.g., explicitly allow) the egress filter task 480 to write the second data to the second segregated physical memory location associated with the second processor 450. The second processor 450 may perform filtering on the second data using a filter task (not shown) as described herein. For example, the second processor 450 may determine (e.g., via the filter task) whether the second data is allowed to egress to one or more other processors (e.g., to the first processor 410). If the second processor 450 determines that the second data is allowed to egress to the one or more other processors, the egress filter task 480 may egress the second data to the one or more other processors. If the second processor 450 determines that the second data is not allowed to egress to the one or more other processors, the egress filter task 480 may block egressing the second data to the one or more other processors.

The first processor 410 may implement an ingress filter task 440 and may process the second data via the ingress filter task 440. The first processor 410 may perform filtering on the second data via a filter task (not shown). For example, the first processor 410 may determine whether the second data is allowed to ingress to the first processor 410 via the filter task. If the first processor 410 determines that the second data is allowed to ingress to the first processor 410, the ingress filter task 440 may ingress the second data from the first segregated physical memory location. If the first processor 410 determines that the second data is not allowed to ingress to the first processor 410, the ingress filter task 440 may block ingressing the second data from the first segregated physical memory location. The MMU may be configured to allow (e.g., explicitly allow) the ingress filter task to read the second data from the first segregated physical memory location.

As described herein, the MMU may be or may include one or more MMU units/portions. For example, the first MMU unit may serve the first processor and the second MMU unit may serve the second processor. As described herein, the MMU may be shared between one or more processors as described herein.

Filter task associated with the first processor and the second processor may be skipped (e.g., omitted). For example, a filter task may be implemented associated with the first processor, along with the egress filter task and/or the ingress filter task. A filter task may be skipped (e.g., omitted) for the second processor. The filter task may be skipped (e.g., omitted) for the first processor, while a filter task may be implemented associated with the second processor. One or more filter tasks may be skipped (e.g., omitted) to ensure backward capabilities with an existing multiprocessor system and/or skip redesigning a multiprocessor system to implement the technique described herein. One or more filter tasks may be skipped (e.g., omitted) to reduce potential cost associated with implementing the technique described herein.

Similar to a microprocessor system shown in FIG. 4, CDS may be skipped (e.g., not be included or omitted) in a separate processor or a processing unit (e.g., as shown in FIGS. 2, 3A, and/or 3B). For size, weight, and/or power constraints the CDS described herein may not be included as shown in FIG. 4. Or for low security risk data transfer between two or more domains (e.g., processors or devices in a disparate domains) CDS may be skipped/omitted (e.g., for size, weight, and/or power constraints).

FIG. 5 illustrates an exemplary diagram of logical data flow security policy 500 as described herein. For example, FIG. 5 illustrates a single-package integrated circuit with multiple CPUs. Each CPU may have dedicated local memory, such as Level 1 Cache, a dedicated MMU, and an interface to a common shared physical memory resource, such as a shared cache or a shared off-chip volatile memory. A memory management controller, such as a MMU, may use a translation lookaside buffer to translate one or more virtual addresses on its CPU interface to one or more corresponding physical addresses on the memory interface.

One or more domains (e.g., domains 1, 2, . . . X) may refer to one or more separate data domains. One or more domains may be mapped to corresponding physical processor cores (CPUs). For example, as shown in FIG. 5, D1 may refer to a first domain (e.g., domain 1) associated with a first processing core (e.g., a first CPU). X1 may refer to a cross domain (e.g., CDS) associated with a second processing core (e.g., a second CPU). D2 may refer to a second domain (e.g., domain 2) associated with a third processing core (e.g., a third CPU).

In examples, one or more domains (e.g., D1 and/or D2) may include one or more tasks (e.g., applications or processes), an egress filter task, and an ingress filter task. For example, D1 and D2 may include D1/D2 task(s), D1/D2 egress filter tasks, and D1/D2 ingress filter tasks, as shown in FIG. 5. In examples, one or more cross domains, such as X1, may include a domain (e.g., domain 1) egress handler task, other domain (e.g., domain 2) egress handler task, a cross domain filter task, a domain (e.g., domain 1) ingress handler task, other domain (e.g., domain 2) ingress handler task. A skilled person in the art will realize that a domain egress handler task may be or may include a cross domain egress task, and a domain egress handler task may be used interchangeably with a cross domain egress task. A skilled person in the art will realize that a domain ingress filter handler task may be or may include a cross domain ingress task, and a domain ingress filter handler task may be used interchangeably with a cross domain ingress task.

Each processing cores/domains may be associated with corresponding memory location. For example, D1 may be associated with D1 memory location. X1 may be associated with X1 memory location. D2 may be associated with D2 memory location. One or more memory locations (e.g., D1 memory location and/or D2 memory location) may include a domain memory location for one or more domain tasks, a domain egress memory location for a domain egress filter task, and/or a domain ingress memory location for a domain ingress filter task. For example, a domain egress memory location may be or may include a set of physical memory addresses dedicated to the storage of data from one or more other domains, e.g., via the cross domain filter's domain egress handler task that is a candidate to be filtered by the associated domain ingress filter task for ingressing the data into the domain. A domain ingress memory location may be or may include a set of physical memory addresses dedicated to the storage of data from one or more other domains, e.g., that has been filtered by the associated domain egress filter task and approved for egress (e.g., write) into the cross domain filter via the domain ingress handler task associated with the cross domain.

One or more memory locations for cross domain filter tasks may include an ingress memory location and an egress memory location. For example, an ingress memory location may be or may include a set of physical memory addresses dedicated to the storage of input data to the cross domain filter task associated with the second CPU. An egress memory location may be or may include a set of physical memory addresses dedicated to the storage of output data from the cross domain filter task.

One or more domains (e.g., D1 and/or D2) may include one or more tasks (e.g., applications or processes), an egress filter task, and an ingress filter task. One or more tasks (e.g., applications or processes) may have access to (e.g., only access to) memory location dedicated to the one or more tasks associated with the domain. For example, as shown in FIG. 5, domain 1 task(s) may be able to read from and write to memory location for domain 1 that is associated with the first processing unit (e.g., CPU1).

An egress filter task may be software (e.g., executable software). For example, the egress filter task may enforce a system security policy associated with a processor. As described herein, the egress filter task may be configured to disallow (e.g., explicitly disallow) egressing of data from a domain associated with a processor into other domain (e.g., memory associated with other domain) associated with other processor(s). The egress filter task may allow egressing the data from a particular domain to another domain if one or more domain filter rules for that particular domain allows (e.g., explicitly allows) the candidate data to egress to other domain(s) (e.g., write to the memory location associated with other domain(s) as described herein). If the one or more domain filter rules explicitly allow egressing the candidate data to other domain(s), the egress filter task may write the candidate data into an assigned location in a memory (e.g., an associated domain egress memory location) via the MMU. The candidate data may include information about a desired destination domain(s) associated with corresponding processor(s) and/or an integrity check value that binds the data to the destination domain information.

An ingress filter task may be software (e.g., executable software). For example, the ingress filter task may enforce a system security policy associated with a processor. As described herein, the ingress filter task may be configured to disallow (e.g., explicitly disallow) ingressing of data from its particular domain's (e.g., domain M) associated with a processor into other domain (e.g., memory associated with other domain) associated with other processor(s). The ingress filter task may allow ingressing the data from a particular domain to another domain based on one or more domain filter rules for that particular domain allows (e.g., explicitly allows) the candidate data to ingress into that domain (e.g., read the candidate data from the memory location associated with the domain). The ingress filter task may verify an integrity binding of the data (e.g., information about the source) and may use one or more domain filter rules to determine if ingress of the data is explicitly allowed. If the one or more domain filter rules do explicitly allow ingressing the candidate data to a domain, the ingress filter task may read the candidate data from an assigned location in a memory (e.g., an associated memory location for ingress memory) via the MMU.

As described herein one or more domain filter rules may include a set of filtration rules. The set of filtration rules may be updated or configured. One or more cross domain filter rules may define which data are permitted to cross and define a set of domain boundaries. The one or more cross domain filter rules may be used by the filter task described herein, e.g., to enforce a system security policy for allowable domain boundary crossings. One or more cross domain filter rules may limit data transfers based on one or more of the following. One or more cross domain filter rules may limit data transfers based on a source domain(s). One or more cross domain filter rules may limit data transfers based on a destination domain(s). One or more cross domain filter rules may limit data transfers based on length. One or more cross domain filter rules may limit data transfers based on one or more attributes within the data. One or more cross domain filter rules may limit data transfers based on the rate at which data is attempting to transfer between domains. One or more cross domain filter rules may limit data transfers based on statistical properties of each data item or an aggregated statistical summary of data between a source and destination. One or more cross domain filter rules may limit data transfers based on date and/or time. One or more cross domain filter rules may limit data transfers based on an active operator(s). One or more cross domain filter rules may limit data transfers based on external sensor information One or more cross domains, such as X1, may include a domain (e.g., domain 1) egress handler task, other domain (e.g., domain 2) egress handler task, a cross domain filter task, a domain (e.g., domain 1) ingress handler task, other domain (e.g., domain 2) ingress handler task. In examples, a cross domain filter task may include a domain egress handler task and another domain egress handler task and a domain ingress handler task and another domain ingress handler task.

A domain egress handler task may be software (e.g., executable software) and may be included in a cross domain filter. A domain egress handler task (e.g., domain 1 egress handler task) may detect data in CDS egress memory location (e.g., associated with CPU 2 as shown in FIG. 5). A domain egress handler task (e.g., domain 1 egress handler task) may read the data and associated information (e.g., source, integrity binding value, and/or the like), may verify the integrity binding value, may copy the data and the associated information (e.g., source, integrity binding value, and/or the like) to associated domain ingress memory location (e.g., domain 1 ingress memory location). The domain egress handler task may verify the copied data and associated information (e.g., source, integrity binding value, and/or the like) stored the associated domain ingress memory location. If the information is corrected copied, the domain egress handler may overwrite the data and the associated information in the CDS egress memory (i.e., to erase the information once processed).

A domain ingress handler task may be software (e.g., executable software) and may be included in a cross domain filter. A domain ingress handler task may detect candidate data in egress memory location of a domain, may read the data and associated information (e.g., destination, integrity binding value, and/or the like). The domain ingress handler task may verify the integrity binding value. The domain ingress handler task may add the source information. The domain ingress handler task may compute an integrity binding value (e.g., a new integrity binding value) over the data and the associated information (e.g., source, destination, and/or the like). The domain ingress handler task may copy the data and the associated information to CDS ingress memory location. The domain ingress handler task may verify the data and the associated information (e.g., source, destination, integrity binding value, and/or the like) that is now stored in the CDS ingress memory location. The domain ingress handler task may overwrite the data and the associated information (e.g., destination, integrity binding value, and/or the like) from the ingress memory location for the associated domain (i.e., to erase the information once processed).

A cross domain filter task may be software (e.g., executable software). A cross domain filter task may enforce a system security policy. The cross domain filter task may disallow egressing and ingressing data between CDS ingress memory location and CDS egress memory location via one or more CDS filter rules. If the one or more CDS Filter Rules explicitly allow data to move (e.g., ingress and egress) between the domains denoted by information associated with the data (e.g., source and destination attributes and/or the like). If the one or more filter rules allow the transfer, the cross domain filter task may copy the data and the associated information to the CDS egress memory location. The cross domain filter task may verify that the copied data and associated information in the CDS egress memory location is correctly written. The cross domain filter task may overwrite (e.g., erase) the data and the associated information from the CDS ingress memory location (i.e., to erase the information once processed).

One or more CDS filter rules may include a set of filtration rules that may be updatable or configurable. The one or more CDS filter rules may explicitly be defining which data are permitted to cross and explicitly-defined set of domain boundaries. The cross domain filter task may use the one or more CDS filter rule to enforce a system security policy, e.g., for allowable domain boundary crossings. The one or more CDS filter rules may limit data transfers, e.g., based on one or more of the following. One or more cross domain filter rules may limit data transfers based on a source domain(s). One or more cross domain filter rules may limit data transfers based on a destination domain(s). One or more cross domain filter rules may limit data transfers based on length. One or more cross domain filter rules may limit data transfers based on one or more attributes within the data. One or more cross domain filter rules may limit data transfers based on the rate at which data is attempting to transfer between domains. One or more cross domain filter rules may limit data transfers based on statistical properties of each data item or an aggregated statistical summary of data between a source and destination. One or more cross domain filter rules may limit data transfers based on date and/or time. One or more cross domain filter rules may limit data transfers based on an active operator(s). One or more cross domain filter rules may limit data transfers based on external sensor information.

A label (e.g., tag) may be included as associated information to the data. A label may be a set of metadata associated with data. For example, a label may be appended to and/or bound with the data while the data traverses one or more cross domain filter tasks. The label may include a source and/or a destination of the data. The label may allow the one or more cross domain filtration tasks to apply the one or more filter rules to enforce the system security policy. An integrity binding value described herein may be appended to bind the label to the associated data. Separation and/or errors may be detected by the one or more cross domain filter tasks and/or domain handler task(s) described herein. A skilled person in the art will realize that label used throughout the specification may refer to tag, and label and tag may be used interchangeably.

Figure 6A:
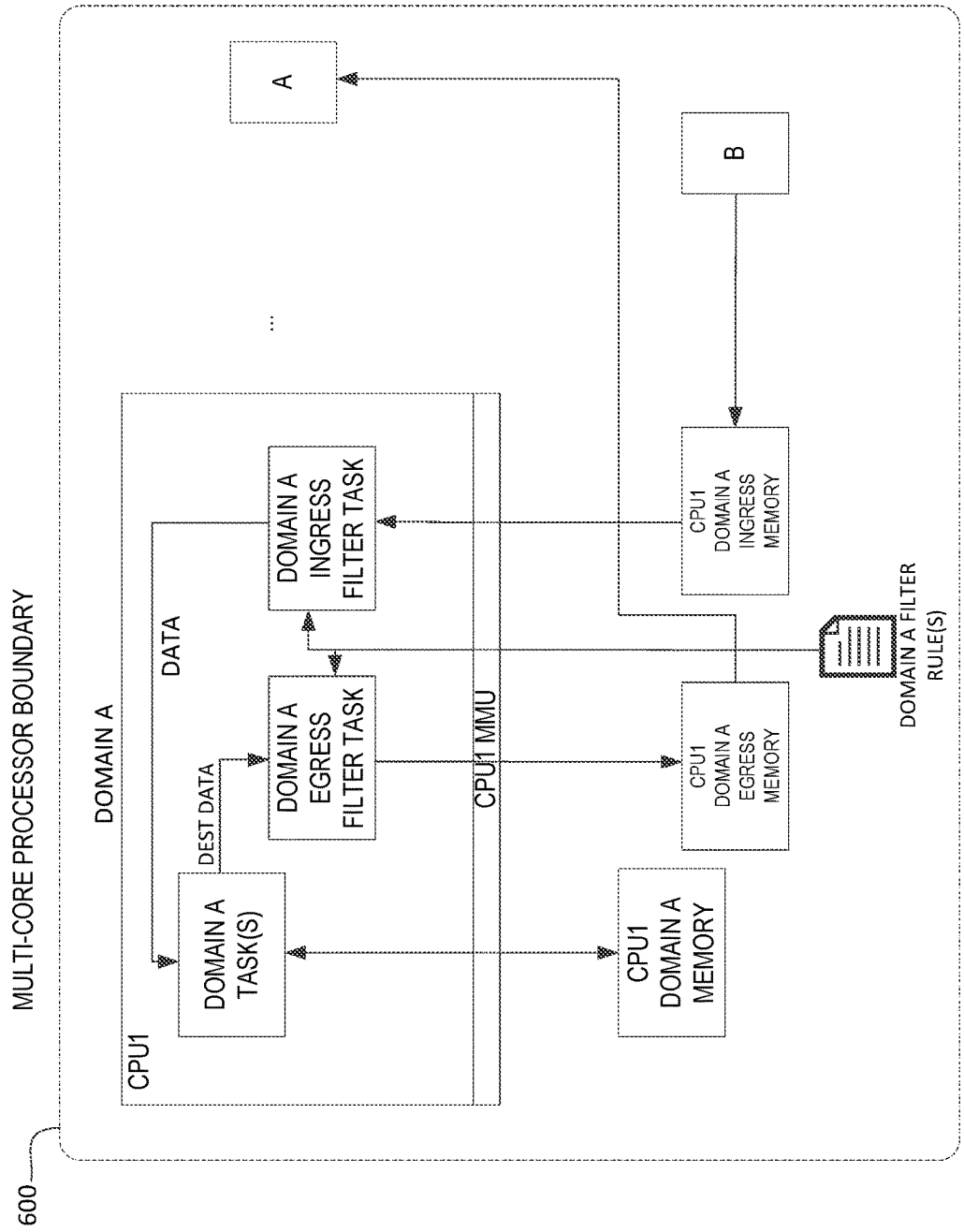
FIGS. 6A-C illustrate an exemplary diagram of logical data flow as described herein.
Figure 6B:
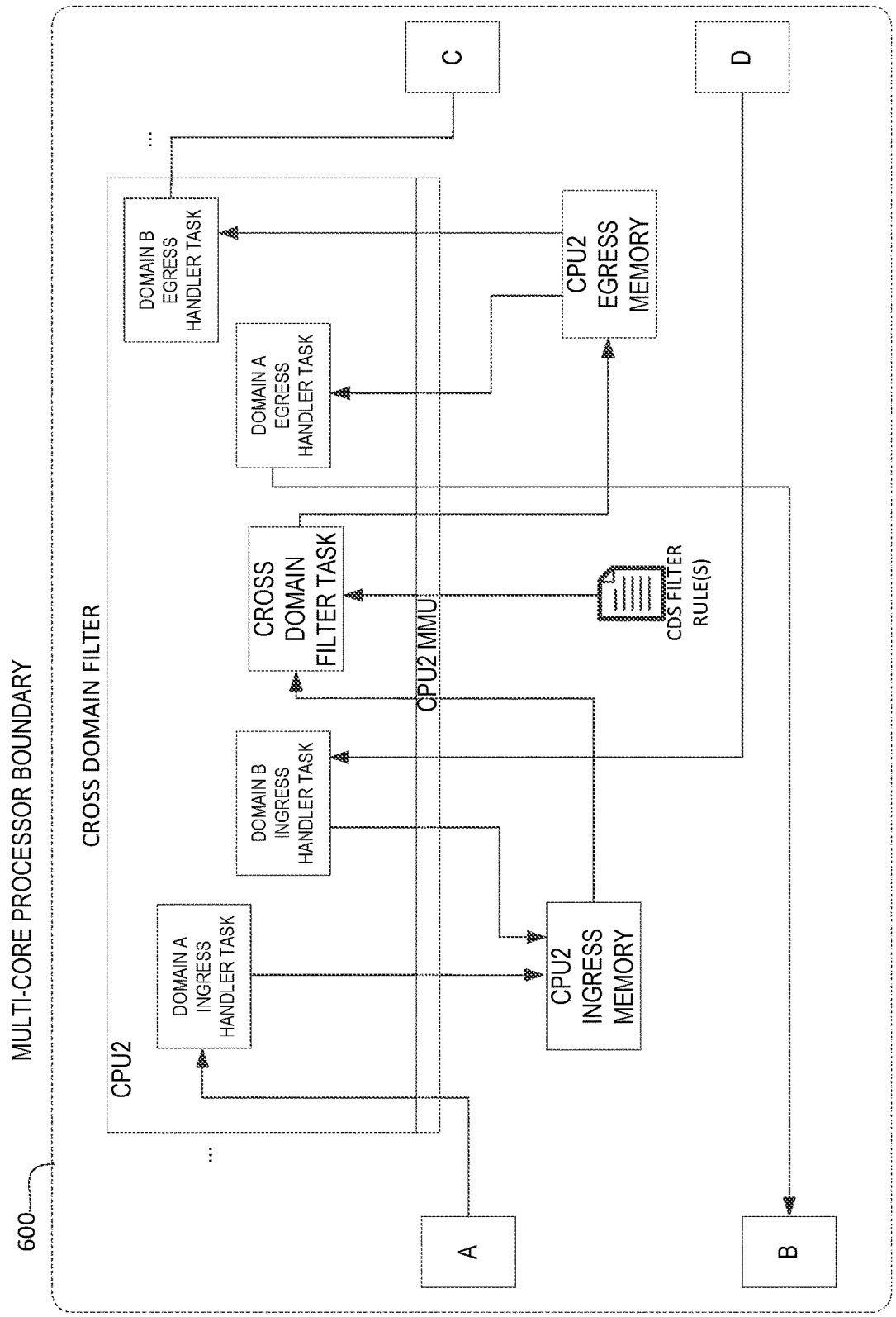
Figure 6C:
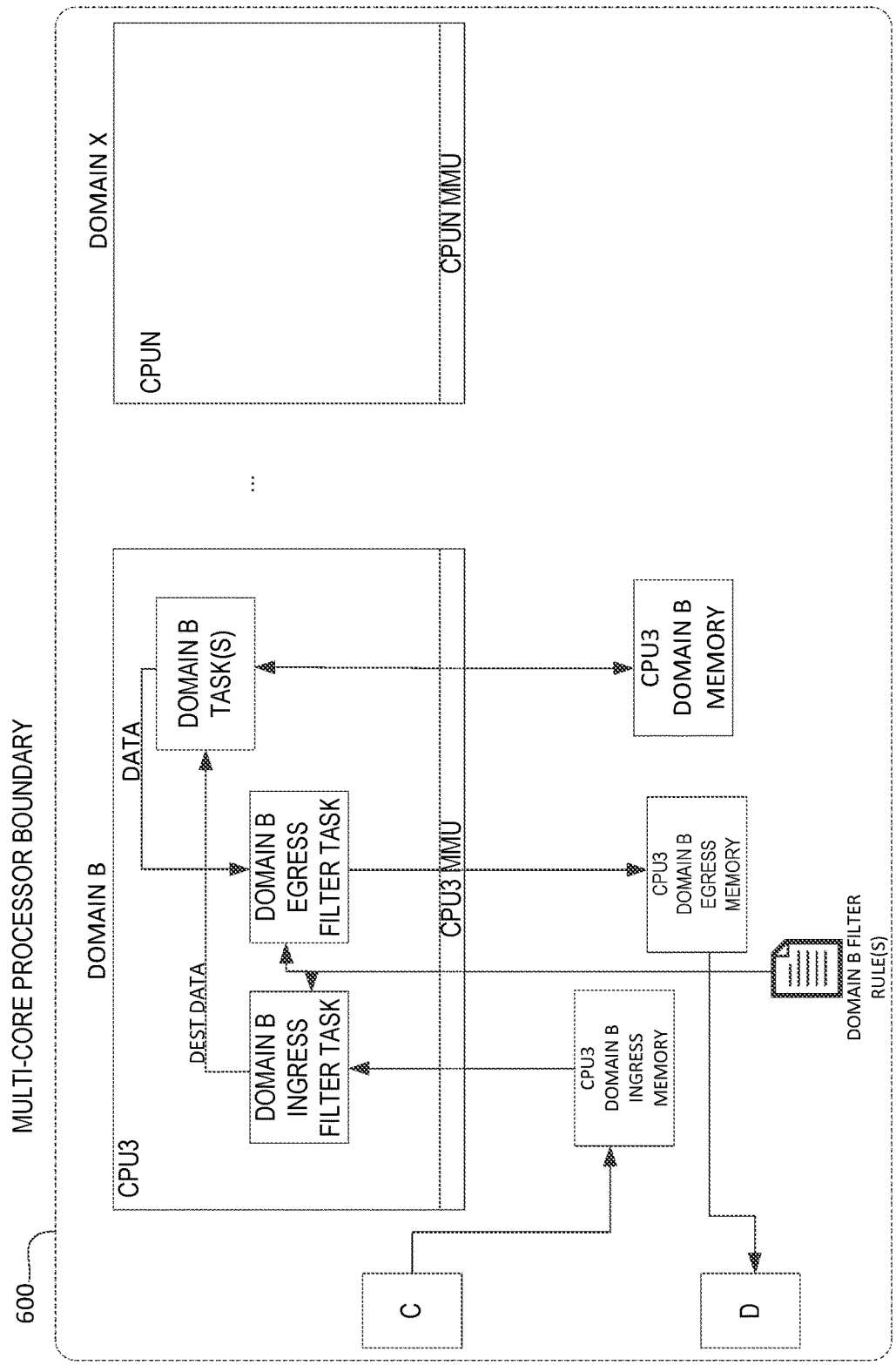

FIGS. 6A-6C illustrate an exemplary diagram of a logical data flow similar to the one in FIG. 5. Similar to FIG. 5, as shown in FIGS. 6A-6C, a multicore processing unit 600 may have a first processor associated with domain A, a second processor associated with one or more cross-domain filters, a third processor associated with domain B, and so on. For example, the processors shown in FIGS. 6A-6C may implement logical data flow security policy shown in FIG. 5.

As shown in FIG. 6A, the first processor (e.g., CPU1) may include one or more tasks (e.g., applications and/or processes), a $domain_A$ egress filter task, and a $domain_A$ ingress filter task. The one or more tasks associated with $domain_A$ may access (e.g., only access) memory associated with $domain_A$ via MMU. The $domain_A$ egress filter task may access (only access) $domain_A$ egress memory via the MMU. The $domain_A$ ingress memory filter task may access (e.g., only access) $domain_A$ ingress memory via the MMU. As described herein, MMU may provide access between the one or more tasks, the $domain_A$ egress filter task, and/or the $domain_A$ ingress filter task and corresponding physical memory (e.g., $domain_A$ memory, $domain_A$ egress memory, and/or $domain_A$ ingress memory). For example, the MMU may provide one or more virtual addresses to the one or more tasks and/or filter tasks. The MMU may assign and/or enforce the mapping between assigned virtual address and/or assigned physical address.

The one or more tasks (e.g., applications and/or processes) may have access to its memory. For example, the MMU may block the one or more tasks attempting to access the egress memory and/or ingress memory. Similarly, the MMU may allow the egress filter task to write (e.g., only write) to the egress memory location and may block any other tasks attempting to the egress memory location, e.g., by blocking the attempt. The MMU may allow the ingress filter task to read (e.g., only read) from the ingress memory location and may block any other tasks attempting to access the ingress memory location, e.g., by blocking the attempt.

As shown in FIG. 6B, one or more cross domain filter tasks may include a $domain_A$ ingress handler task, $domain_B$ ingress handler task, one or more cross domain filter task(s), $domain_A$ egress handler task, and/or $domain_B$ egress handler task. As described herein, the one or more cross domain filter tasks may include filter tasks (not shown) associated with each handler task, e.g., to ensure the correct data transfer between domains. The ingress handler tasks may have access to the ingress memory location (e.g., via corresponding ingress filter tasks), and the egress handler tasks may have access to the egress memory location (e.g., via corresponding egress filter tasks).

FIG. 6C may illustrate a third processor (e.g., CPU3) associated with $domain_B$. As shown in FIG. 6C, the third processor may include a $domain_B$ ingress filter task, a $domain_B$ egress filter task, and one or more tasks (e.g., applications and/or processes). The MMU may allow the ingress filter task to access the ingress memory location. For example, the MMU may allow the $domain_B$ ingress filter task to read (e.g., only read) from the $domain_B$ ingress memory location. The MMU may allow the ingress filter task to disallow (e.g., prevent) access to the ingress memory location that that is not allowed (e.g., explicitly allowed) between any tasks and any memory locations. For example, the MMU may allow the $domain_B$ ingress filter task to disallow (e.g., prevent) reading from the $domain_B$ ingress memory location if the tasks are not allowed (e.g., explicitly allowed). The MMU may allow the egress filter task to access the egress memory location. For example, the MMU may allow the $domain_B$ egress filter task to write (e.g., only write) from the $domain_B$ egress memory location. The MMU may allow the egress filter task to disallow (e.g., prevent) access to the egress memory location that that is not allowed (e.g., explicitly allowed) between any tasks and any memory locations. For example, the MMU may allow the $domain_B$ egress filter task to disallow (e.g., prevent) writing to the $domain_B$ egress memory location if the tasks are not allowed (e.g., explicitly allowed). The MMU may allow the one or more tasks to access from the memory location. For example, the MMU may allow the one or more $domain_B$ tasks to access (e.g., only access) the $domain_B$ memory location. The MMU may disallow the one or more tasks to access from the memory location if the one or more tasks are not allowed (e.g., explicitly allowed). For example, the MMU may allow disallow the one or more $domain_B$ tasks to access the $domain_B$ memory location if the one or more $domain_B$ tasks are not allowed (e.g., explicitly allowed)

MMU described herein may be or may include one or more MMU portions/units. For example, a first MMU unit may serve a first processor and a second MMU unit may serve a second processor in a multicore processing unit. The first MMU unit may allow (e.g., explicitly allow) an egress filter task that is associated with the first processor to write data to a first segregated physical memory location. The first MMU unit may disallow (e.g., block) one or more applications or processes associated with the first processor (e.g., that is other than the egress filter task) accessing the first segregated physical memory location (e.g., that are not explicitly allowed). The second MMU unit may allow an ingress filter task associated with the second processor to read data and write to a second segregated physical memory location. The second MMU unit may disallow (e.g., block) one or more applications or processes associated with the second processor (e.g., that is other than the ingress filter task) accessing the second segregated physical memory location. If the egress filter task associated with the first processor determines that the data is not allowed to egress (e.g., not explicitly allowed), the egress filter task (e.g., that is associated with the first MMU unit) may disallow (e.g., block) the data egressing to the first segregated physical memory location. For example, as described herein, the egress filter task may allow (e.g., only allow) the data to egress in the egress memory location if the data is allowed (e.g., explicitly allowed). If the ingress filter task associated with the second processor determines that the data is not allowed to ingress, the ingress filter task (e.g., that is associated with the second MMU unit) may disallow (e.g., block) the data ingressing to the second segregated physical memory location. For example, as described herein, the ingress filter task may allow (e.g., only allow) the data to ingress from the ingress memory location if the data is allowed (e.g., explicitly allowed).

The one or more MMU units may include a third MMU unit that serves a third processor associated with the multicore processor. The third MMU unit may allow (e.g., explicitly allow) one or more cross domain filter tasks associated with the third processor to read data from the first segregated physical memory location and to write the data to the second segregated physical memory location. The one or more cross domain filter tasks may be or may include a cross domain ingress task and a cross domain egress task. The third MMU may allow (e.g., explicitly allow) the cross domain ingress task to read the data from the first segregated physical memory location and may allow the cross domain egress task to write the data to the second segregated physical memory location.

The second MMU unit may allow (e.g., explicitly allow) an egress filter task associated with the second processor to write data (e.g., second data) to the second segregated physical memory location. The first MMU unit may allow (e.g., explicitly allow) an ingress filter task associated with the first processor to read the data (e.g., the second data) to the first segregated physical memory location.

A multicore processor (e.g., and the MMU) may be or may include in a single-package integrated circuit. An egress filter task, an ingress filter task, and/or one or more cross domain filter tasks described herein may apply to a system with a multicore processing unit and may provide a multi-order failure resistant data isolation and cross domain filtration and segregation system for two or more domains (e.g., in a multicore processing unit system). The filtering and cross domain filtration and segregation system described herein may provide unidirectional data transfer between domains and one or more associated filters to ensure that data is egressing from and ingressing to proper domains associated with corresponding processors.

The multicore processor may have two or more processors that are configured to implement a set of one or more applications and/or processes. A first processor may include an egress filter task. The first processor may include an ingress filter task. A second processor may include at least one cross domain filter tasks. A third processor may include an ingress filter task. The third processor may include egress filter task.

The first processor may process data to be transfer to other processor (e.g., other domains). The first processor may process the data via the egress filter task. The MMU may be configured to allow (e.g., explicitly allow) the egress filter task to write the data to a segregated physical memory location. The MMU may block one or more other applications and/or processes that are other than the egress filter task from accessing the data from the segregated physical memory location.

The second processor may process the data by performing filtering via one or more cross domain filter tasks. The MMU may be configured to allow (e.g., explicitly allow) the one or more cross domain filter tasks to read the data from the segregated physical memory location (e.g., that is associated with the first processor) and write to another segregated physical memory location (e.g., that is associated with the second processor) if one or more cross domain filter tasks are satisfied.

The third processor may process the data via the ingress filter task. The MMU may be configured to allow (e.g., explicitly allow) the ingress filter task to read from the other segregated physical memory location (e.g., second segregated physical memory location) to the associated domain. The MMU may block one or more other applications and/or processes accessing the data from the segregated physical memory location.

The egress filter task associated with the first processor and the ingress filter task associated with the third processor may be configured to ensure unidirectionality of data transfer between different domains associated with different processors. The one or more cross domain filter tasks associated with the second processor may provide another layer of security and a multi-order failure resilient approach to ensure unidirectionality of data transfer described herein and to further provide data separability.

The one or more cross domain filter tasks associated with the second processor may include a cross domain ingress task and a cross domain egress task that are configured to process the data (e.g., data transfer between domains). The one or more cross domain filter tasks may include a filter task to perform filtering of the data. The MMU may be configured to allow (e.g., explicitly allow) the cross domain ingress task to read the data from the segregated physical memory location (e.g., that is associated with the first processor or the first segregated physical memory location). The MMU may be configured to allow (e.g., explicitly allow) the cross domain egress task to write the data to the segregated physical memory location (e.g., that is associated with the second processor or the second segregated physical memory location). The filter task may be configured to determine whether the data is allowed to egress to one or more other domains (e.g., third domain associated with the third processor) via the one or more cross domain filter tasks described herein. If the filter task determines that the data is allowed to egress to the second domain, the filter task may allow the data to egress to the second domain. If the filter task determines that the data is not allowed to egress to the second domain, the filter task may block the data egressing to the second domain.

Unidirectionality of data transfer described herein may be implemented in another direction. For example, the third processor may include an egress filter task and may process another data (e.g., second data) via the egress filter task. The MMU may be configured to allow (e.g., explicitly allow) the egress filter associated with the third processor to write the data (e.g., second data) to the second segregated physical memory location. The one or more cross domain filter tasks may perform filtering on the other data (e.g., second data from the third processor). The MMU may be configured to allow (e.g., explicitly allow) the one or more cross domain filter tasks to read from the second segregated physical memory location and write to the first segregated physical memory location. The first processor may include an ingress filter task and may process the data (e.g., second data) via the ingress filter task. The MMU may be configured to allow (e.g., explicitly allow) the ingress filter task to read the data from the first segregated physical memory location.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A computing device comprising a memory management unit (MMU) and a multicore processor, the multicore processor comprising:
    a first processor, the first processor configured to:
        implement a first set of one or more applications or processes, wherein one of the first set of one or more applications or processes comprises an egress filter task, and
        process a first data via the egress filter task, wherein the MMU is configured to allow the egress filter task to write the first data to a first segregated physical memory location; and
    a second processor, the second processor configured to:
        implement a second set of one or more applications or processes, wherein the second set of one or more applications or processes comprises at least one cross domain filter task, and
        perform filtering on the first data via the at least one cross domain filter task, wherein the MMU is configured to allow the at least one cross domain filter task to read from the first segregated physical memory location and write to a second segregated physical memory location; and
    a third processor, the third processor configured to:
        implement a third set of one or more applications or processes, wherein one of the third set of one or more applications or processes comprises an ingress filter task, and
        process the first data via the ingress filter task, wherein the MMU is configured to allow the ingress filter task to read the first data from the second segregated physical memory location.

2. The computing device of claim 1, wherein the MMU is configured to write the first data to the first segregated physical memory location and the second segregated physical memory location in a memory, wherein the first segregated physical memory location is separated from the second segregated physical memory location.

3. The computing device of claim 1, wherein the MMU is configured to block the first set of one or more applications or processes other than the egress filter task accessing the first segregated physical memory location, and wherein the MMU is configured to block the third set of one or more applications or processes other than the ingress filter task accessing the second segregated physical memory location.

4. The computing device of claim 1, wherein the at least one cross domain filter task comprises:
   a cross domain ingress task configured process the first data, wherein the MMU is configured to allow the cross domain ingress task to read the first data from the first segregated physical memory location;
   a filter task configured to perform filtering on the first data; and
   a cross domain egress task configured process the first data, wherein the MMU is configured to allow the cross domain egress task to write the filtered first data to the second segregated physical memory location.

5. The computing device of claim 4, wherein the filter task configured to perform filtering on the first data comprises:
   determine whether the first data is allowed to egress to a second domain associated with the third processor;
   on a condition that the first data is allowed to egress to the second domain, egress the first data to the second domain; and
   on a condition that the first data is not allowed to egress to the second domain, block the first data from egressing to the second domain, wherein the MMU is configured to block the second set of one or more applications or processes other than the at least one cross domain filter task from accessing the first segregated physical memory location and the second segregated physical memory location.

6. The computing device of claim 1, wherein:
   the third processor is configured to:
      implement the first set of one or more applications or processes, wherein one of the first set of one or more applications or processes further comprises an egress filter task, and
      process a second data via the egress filter task, wherein the MMU is configured to allow the egress filter task to write the second data to a third segregated physical memory location;
   the second processor is configured to:
      perform filtering on the second data via the at least one cross domain filter task, wherein the MMU is configured to allow the at least one cross domain filter task to read from the third segregated physical memory location and write to a fourth segregated physical memory location; and
   the first processor is configured to:
      implement the third set of one or more applications or processes, wherein one of the third set of one or more one or more applications or processes further comprises an ingress filter task, and
      process the second data via the ingress filter task, wherein the MMU is configured to allow the ingress filter task to read the second data from the fourth segregated physical memory location.

7. The computing device of claim 1, wherein one of the first set of one or more applications or processes further comprises a first filter process, and wherein one of the second set of one or more applications or processes further comprises a second filter process, wherein:
   the first processor is configured to:
      perform filtering on the first data to determine whether the first data is allowed to egress a second domain associated with the third processor from a first domain associated with the first processor;
      on a condition that the first data is allowed to egress to the second domain, egress the first data to the second domain; and
      on a condition that the first data is not allowed to egress, block the first data from egressing to the second domain;
   the third processor is configured to:
      perform filtering on the first data to determine whether the first data is allowed to ingress;
      on a condition that the first data is allowed to ingress to the second domain, ingress the first data to the second domain; and
      on a condition that the first data is not allowed to ingress, block the first data from ingressing to the second domain.

8. A computing device comprising a memory management unit (MMU) and a multicore processor, the multicore processor comprising:
   a first processor, the first processor configured to:
      implement a first set of one or more applications or processes, wherein the first set of one or more applications or processes comprises an egress filter task and a first filter task,
      process a first data via the egress filter task, wherein the MMU is configured to allow the egress filter task to write the first data to a first segregated physical memory location, and
      perform filtering on the first data via the first filter task; and
   a second processor, the second processor configured to:
      implement a second set of one or more applications or processes, wherein the second set of one or more applications or processes comprises an ingress filter task and a second filter task,
      perform filtering on the first data via the second filter task, and
      process the first data via the ingress filter task, wherein the MMU is configured to allow the ingress filter task to read the first data from a second segregated physical memory location.

9. The computing device of claim 8, wherein the MMU is configured to block the first set of one or more applications or processes other than the egress filter task or the first filter task accessing the first segregated physical memory location, and wherein the MMU is configured to block the second set of one or more applications or processes other than the ingress filter task or the second filter task accessing the second segregated physical memory location.

10. The computing device of claim 8, wherein:
    the first processor configured to perform filtering on the first data via the first filter task, the first processor is configured to:
       access the first data from the first segregated physical memory location via the first filter task, wherein the MMU is configured to allow the first filter task to read from the first segregated physical memory location;
       determine whether the first data is allowed to egress to a second domain associated with the second processor;
       on a condition that the first data is allowed to egress to the second domain, egress the first data to the second domain, and
       on a condition that the first data is not allowed to egress to the second domain, block the first data from egressing to the second domain; and the second processor configured to perform filtering on the first data via the second filter task, the second processor is configured to:
identify the first data that is egressing from the first segregated physical memory location via the second filter task;
determine whether the first data is allowed to ingress to the second domain;
on a condition that the first data is allowed to ingress to the second domain, ingress the first data to the second domain; and
on a condition that the first data is not allowed to ingress to the second domain, block the first data from ingressing to the second domain.

11. The computing device of claim 8, wherein the first and the second segregated memory locations are the same segregated memory location.

12. A computing device comprising a multicore processor and a plurality of memory management unit (MMU) units, the plurality of MMU units comprising:
a first MMU unit, the first MMU unit configured to:
serve a first processor associated with the multicore processor, wherein the first MMU unit is configured to allow an egress filter task associated with the first processor to write a first data to a first segregated physical memory location, and
block one or more applications or processes associated with the first processor other than the egress filter task from accessing the first segregated physical memory location; and
a second MMU unit, the second MMU unit configured to:
serve a second processor associated with the multicore processor, wherein the second MMU unit is configured to allow an ingress filter task associated with the second processor to read the first data to a second segregated physical memory location, and
block one or more applications or processes associated with the second processor other than the ingress filter task from accessing the first segregated physical memory location.

13. The computing device of claim 12, wherein the first and second MMU units are implemented from a common MMU of the computing device.

14. The computing device of claim 12, wherein:
on a condition that the egress filter task associated with the first processor determines that the first data is not allowed to egress, the first MMU unit is configured to block the first data egressing to the first segregated physical memory location; and
on a condition that the ingress filter task associated with the second processor determines that the first data is not allowed to ingress, the second MMU unit is configured to block the first data ingressing to the second segregated physical memory location.

15. The computing device of claim 12, wherein the plurality of MMU units further comprising:
a third MMU unit, the third MMU unit configured to:
serve a third processor associated with the multicore processor; and
allow at least one cross domain filter task associated with the third processor to read the first data from the first segregated physical memory location and write the first data to the second segregated physical memory location,
wherein the at least one cross domain filter task further comprises a cross domain ingress task and a cross domain egress task configured to process the first data, wherein the third MMU unit is configured to allow the cross domain ingress task to read the first data from the first segregated physical memory location and allow the cross domain egress task to write the first data to the second segregated physical memory location.

16. The computing device of claim 12, wherein
the second MMU unit is configured to allow an egress filter task associated with the second processor to write a second data to the second segregated physical memory location; and
the first MMU unit is configured to allow an ingress filter task associated with the first processor to read the second data to the first segregated physical memory location.

17. A computing device comprising a multicore processor, the multicore processor comprising:
a first processor, the first processor configured to:
implement a first set of one or more applications or processes, wherein the first set of one or more applications or processes comprises an egress filter task and a first filter task,
process a first data via the egress filter task, wherein the egress filter task is configured to write the first data to a first segregated physical memory location, wherein one or more other processes other than the egress filter task are restricted from writing data to the first segregated physical memory location; and
perform filtering on the first data via the first filter task; and
a second processor, the second processor configured to:
implement a second set of one or more applications or processes, wherein the second set of one or more applications or processes comprises an ingress filter task and a second filter task,
process the first data via the ingress filter task, wherein the ingress filter task is configured to read the first data from the first segregated physical memory location, wherein one or more other processes other than the ingress filter task are restricted from reading data from the first segregated physical memory location; and
perform filtering on the first data via the second filter task.

18. The computing device of claim 17, wherein one or more of a memory management unit (MMU) and a hypervisor are configured to restrict the one or more other processes other than the egress filter task from writing the data to the first segregated physical memory location and to restrict one or more other processes other than the ingress filter task from reading the data from the first segregated physical memory location.

19. The computing device of claim 17, wherein:
the first processor configured to perform filtering on the first data via the first filter task, the first processor is configured to:
access the first data from the first segregated physical memory location via the first filter task, wherein the first filter task is allowed to read from the first segregated physical memory location;
determine whether the first data is allowed to egress to a second domain associated with the second processor;

on a condition that the first data is allowed to egress to the second domain, egress the first data to the second domain, and on a condition that the first data is not allowed to egress to the second domain, block the first data from egressing to the second domain; and the second processor configured to perform filtering on the first data via the second filter task, the second processor is configured to:

identify the first data that is egressing from the first segregated physical memory location via the second filter task;

determine whether the first data is allowed to ingress to the second domain;

on a condition that the first data is allowed to ingress to the second domain, ingress the first data to the second domain; and on a condition that the first data is not allowed to ingress to the second domain, block the first data from ingressing to the second domain.

20. The computing device of claim 17, wherein:

the second processor is configured to:

implement the second set of one or more applications or processes, wherein the second set of one or more applications or processes further comprises an egress filter task, process a second data via the egress filter task, wherein the egress filter task is allowed to write the second data to a third segregated physical memory location;

perform filtering on the second data via the second filter task; and the first processor is configured to:

implement the first set of one or more applications or processes, wherein the first set of one or more applications or processes further comprises an ingress filter task, perform filtering on the second data via the second filter task; and process the second data via the ingress filter task, wherein the ingress filter task is allowed to read the second data to a fourth segregated physical memory location.

\* \* \* \* \*